United States Patent
Xu et al.

(10) Patent No.: US 12,088,344 B1
(45) Date of Patent: *Sep. 10, 2024

(54) SYSTEMS AND METHODS FOR COHERENT OPTICAL BACKHAULING

(71) Applicant: CABLE TELEVISION LABORATORIES, INC., Louisville, CO (US)

(72) Inventors: Mu Xu, Broomfield, CO (US); Luis Alberto Campos, Superior, CO (US); Curtis Dean Knittle, Superior, CO (US); Haipeng Zhang, Broomfield, CO (US); Zhensheng Jia, Superior, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 228 days.

This patent is subject to a terminal disclaimer.

(21) Appl. No.: 17/714,139

(22) Filed: Apr. 5, 2022

Related U.S. Application Data

(63) Continuation-in-part of application No. 17/503,643, filed on Oct. 18, 2021.

(60) Provisional application No. 63/146,164, filed on Feb. 5, 2021, provisional application No. 63/092,785, filed on Oct. 16, 2020.

(51) Int. Cl.
  *H04B 10/40* (2013.01)
  *H04J 14/02* (2006.01)

(52) U.S. Cl.
  CPC .......... *H04B 10/40* (2013.01); *H04J 14/0238* (2013.01)

(58) Field of Classification Search
  CPC ........ H04Q 11/0062; H04Q 2011/0064; H04B 10/40; H04B 10/61; H04B 10/66
  See application file for complete search history.

(56) References Cited

U.S. PATENT DOCUMENTS

| | | | |
|---|---|---|---|
| 2013/0044766 A1* | 2/2013 | Pantelias | H04L 12/2801 370/468 |
| 2016/0380698 A1* | 12/2016 | Elahmadi | G02B 6/00 398/135 |
| 2019/0245619 A1* | 8/2019 | Campos | H04J 14/0286 |
| 2020/0280372 A1* | 9/2020 | Li | H01S 5/0085 |

* cited by examiner

*Primary Examiner* — Pranesh K Barua
(74) *Attorney, Agent, or Firm* — Josh C. Snider; Snider IP

(57) ABSTRACT

An integrated transceiver is provided for a coherent optical communication network. The integrated transceiver includes a first optical transceiver portion configured to receive and transmit coherent optical signals from and to the coherent optical communication network, respectively. The integrated transceiver further includes a second optical transceiver portion configured to receive and transmit non-coherent optical signals respectively from and to a non-coherent optical communication network. The integrated transceiver further includes an integrated media access control (MAC) processor disposed between the first and second optical transceiver portions. The integrated MAC processor is configured to (i) exchange cooperative scheduling information from the first optical transceiver portion to the second optical transceiver portion, and (ii) enable the first optical transceiver portion to schedule data traffic between the coherent and non-coherent optical communication networks using scheduling information obtained from a control plane of the second optical transceiver portion.

15 Claims, 19 Drawing Sheets

SYSTEMS AND METHODS FOR COHERENT OPTICAL BACKHAULING

CROSS REFERENCE TO RELATED APPLICATIONS

This application is a continuation-in-part of U.S. patent application Ser. No. 17/503,643, filed Oct. 18, 2021, which prior application claims the benefit of and priority to U.S. Provisional Patent Application Ser. No. 63/092,785, filed Oct. 16, 2020. This application also claims the benefit of and priority to U.S. Provisional Patent Application Ser. No. 63/146,164, filed Feb. 5, 2021. The respective disclosures of all of these prior applications are incorporated herein by reference in their entireties.

FIELD

The field of the disclosure relates generally to communication networks, and more particularly, to optical communication networks employing backhauling technologies.

BACKGROUND

Conventional access networks, and particularly within the cable operator paradigm, are presently undergoing a fundamental shift; operations that have been traditionally centralized at the hub or headend are now being relocated into distributed architectures. That is, typical hub/headend functionality is now beginning to reside closer to subscriber terminal end user devices, such as in intelligent fiber nodes between the hub/headend and the end users. These distributed architectures have helped to relieve space, hardware, and power constraints at the hub/headend; however, decentralizing the control raises particular challenges to network operators supporting multiple services on a common transport platform, as described further below with respect to FIG. 1.

FIG. 1 is a schematic illustration of a conventional optical communication network architecture 100, which is capable of supporting multiple services. In the example depicted in FIG. 1, architecture 100 is illustrated as a converged cable access platform (CCAP) network, and represents an aggregation use case of an optical access network including a hub/headend 102, an aggregation node 104, and a plurality of end users 106 utilizing various different respective services (e.g., homes/residences, mobile x-hauling, businesses or enterprise connections, etc.).

Hub/headend 102 and aggregation node 104 are communicatively coupled by a first optical fiber 108 (sometimes referred to as "long fiber"), and aggregation node 104 communicates with respective end users 106 over one or more second optical fibers 110 (sometimes referred to as "short fibers"). In this conventional example, end users 106(1-3) are depicted as residences, which receive digital optical signals from respective second optical fibers 108 by way of a remote physical layer (PHY) device (RPD) 112 (e.g., end user 106(1)) and/or a remote media access control (MAC) and PHY device (remote MAC-PHY device, or RMD) 114 (e.g., end user 106(2)) communicating with the end user subscribers over cables 116, and/or by way of a remote optical line terminal (OLT) 118 (e.g., end user 106(3)), in a fiber-to-the-premises (FTTP) or fiber-to-the-home (FTTF) configuration).

Architecture 100 thus depicts a common transport platform operating over a typical point-to-multipoint (P2MP) topology, which is also referred to a tree or trunk-and-branch topology. Such conventional network topologies utilize digital optical technology to split the downlink (DL) hub signals by either an active optical network (AON) topology, or a passive optical network (PON) technology. The following description primarily follows the PON example; however, the person of ordinary skill in the art will understand that such is for ease of explanation, and is not intended to be limiting.

For example, in the AON approach, hub/headend 102 transmits a single 100 or 200 Gbps coherent optical signal to aggregation node 104 (at a distance of up to 80 km for first optical fiber 108). Aggregation node 104 terminates the optical link from hub/headend 102, and then generates multiple 10 Gbps links to respective end users 106 using low cost grey optics that may only need to span a few kilometers (i.e., the length of second fibers 110). In this example, aggregation node 104 would include one of several different types of electrically powered network devices, such as a router, switch, or muxponders. In contrast, the PON approach uses optical splitters, which require no electrical power in aggregation node 104 to transmit signal to the respective child nodes.

Architecture 100 thus illustrates a distributed network topology that simultaneously supports multiple services to pluralities of different types of end users 106 using RPD 112, RMD 114, and/or a remote PON (e.g., OLT 118), as well as more direct services such as mobile x-haul (e.g., end user 106(4)) and business/enterprise connectivity (e.g., end user 106(5)). However, because this conventional system requires different schedulers for each of the respective multiple services, the distributed topology thereof introduces significant latency into the multiple separately-scheduled signals.

Architecture 100 further illustrates another significant recent change to the optical access network, namely, how analog optical networks traditionally found between the hub and fiber node are now being replaced with digital optics to improve the signal to noise ratio (SNR). However, with this improvement to the access network hardware, the count of optical endpoints has also grown exponentially, and with fewer subscriber end users for each such optical endpoint, to meet the bandwidth demand for more service groups. There is thus a significant desire in the field for increased and improved optical backhauling to aggregate optical links from each downstream (or "child") node and enable the transport connection to the hub or headend.

Accordingly, since optical backhauling capacity is driven both by this ever-increasing residential data service tier growth rate, and also by the increasing number of services types supported by the network (e.g., business, mobile x-haul, various FTTP PONs, etc.), there is a further need in the industry to both integrate and coordinate the multiple different services among the plurality of optical endpoints to reduce the latency, costs, and footprint of the network.

SUMMARY

In an embodiment, an integrated transceiver is provided for a coherent optical communication network. The integrated transceiver includes a first optical transceiver portion configured to receive and transmit coherent optical signals from and to the coherent optical communication network, respectively. The integrated transceiver further includes a second optical transceiver portion configured to receive and transmit non-coherent optical signals respectively from and to a non-coherent optical communication network. The integrated transceiver further includes an integrated media access control (MAC) processor disposed between the first and second optical transceiver portions. The integrated MAC processor is configured to (i) exchange cooperative scheduling information from the first optical transceiver portion to the second optical transceiver portion, and (ii) enable the first optical transceiver portion to schedule data traffic between the coherent and non-coherent optical communication networks using scheduling information obtained from a control plane of the second optical transceiver portion.

BRIEF DESCRIPTION

These and other features, aspects, and advantages of the present disclosure will become better understood when the following detailed description is read with reference to the accompanying drawings in which like characters represent like parts throughout the drawings, wherein.

Figure 13A:
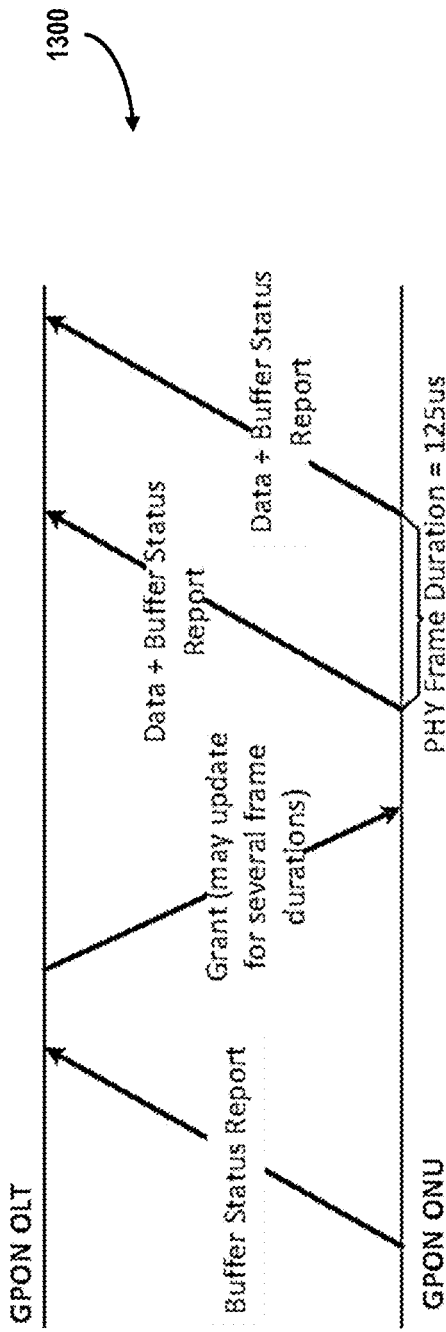
Figure 13B:
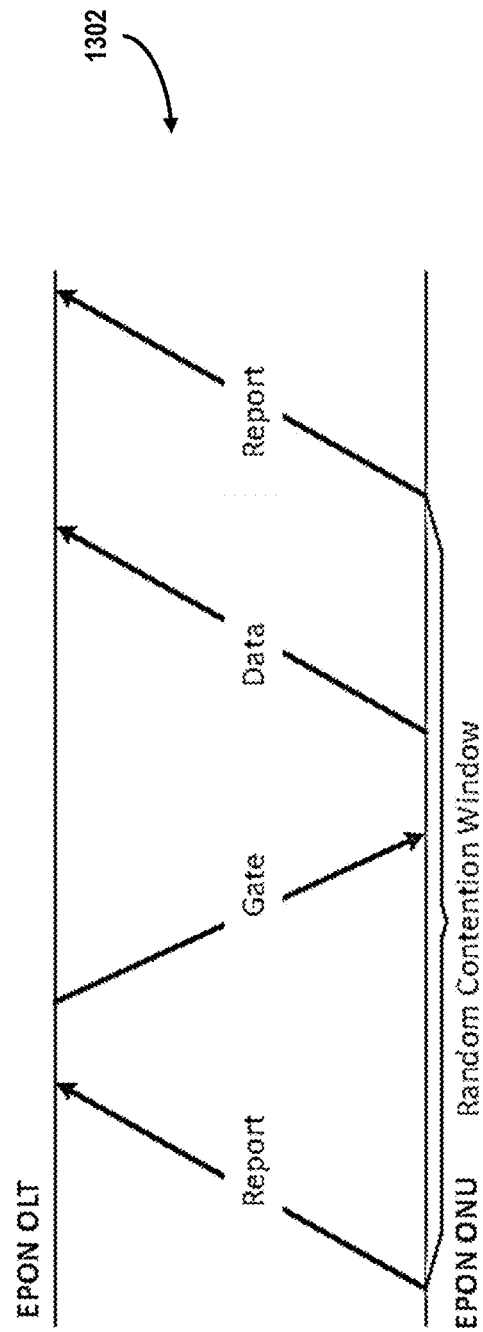

FIGS. 13A-B are comparative graphical illustrations depicting conventional uplink data link processes.

Figure 14:
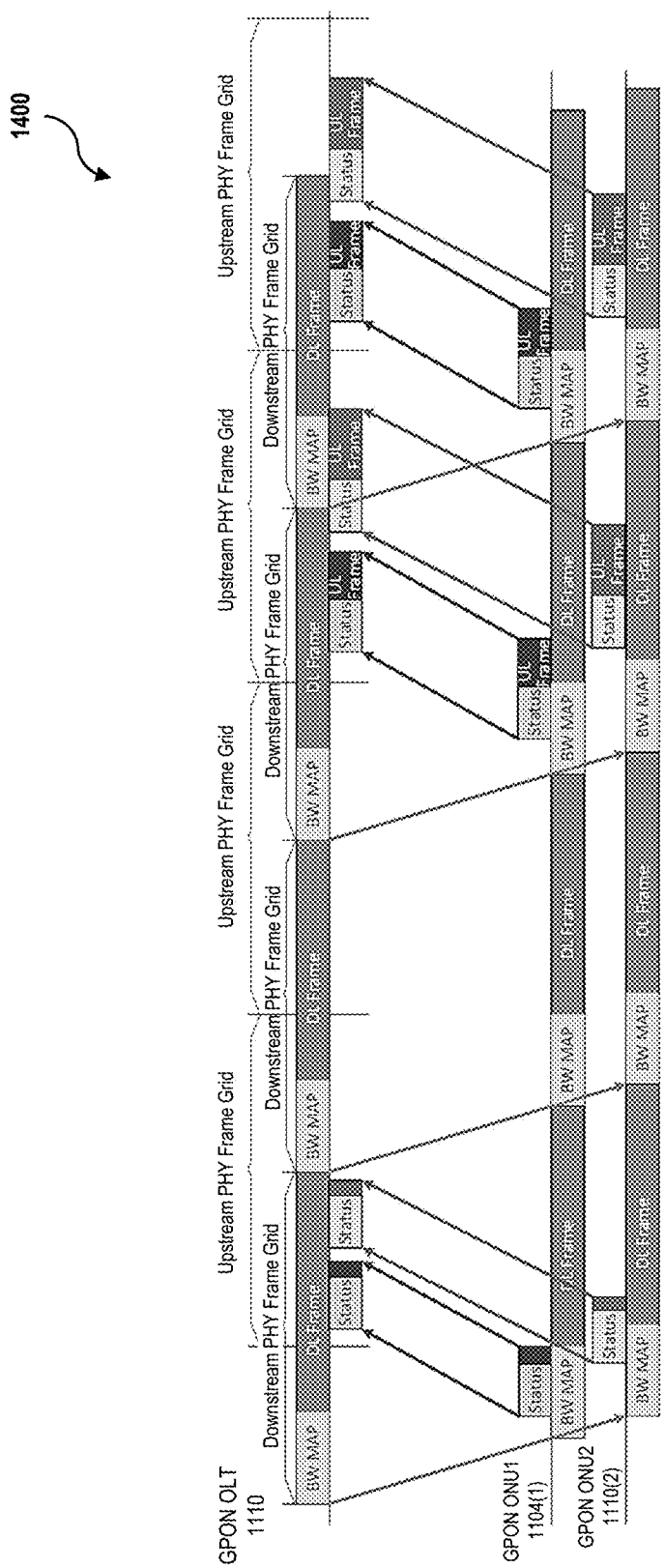

FIG. 14 illustrates an exemplary timing flow diagram for bi-directional data transmission in a gigabit passive optical network, in accordance with an embodiment.

Figure 15:
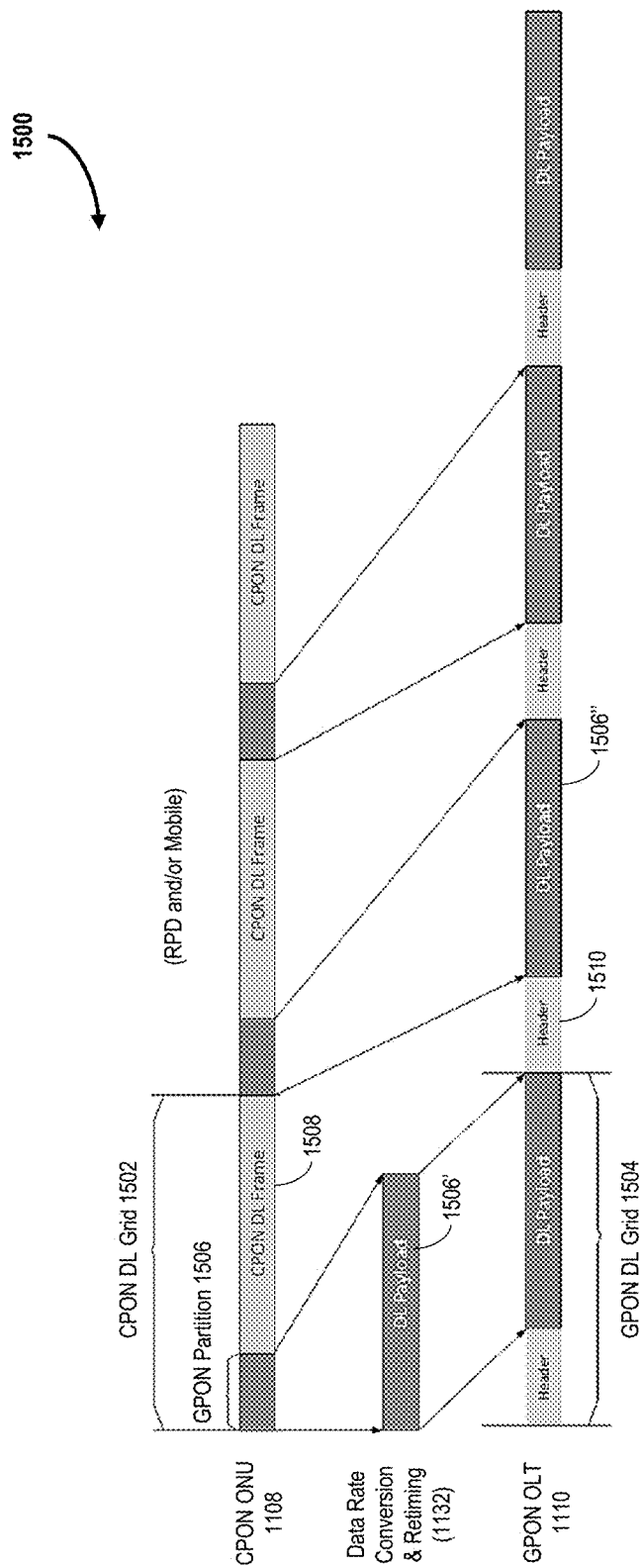

FIG. 15 illustrates an exemplary coherent backhauling data re-encapsulation scheme for the gigabit passive optical network downlink of the diagram depicted in FIG. 14.

Figure 16:
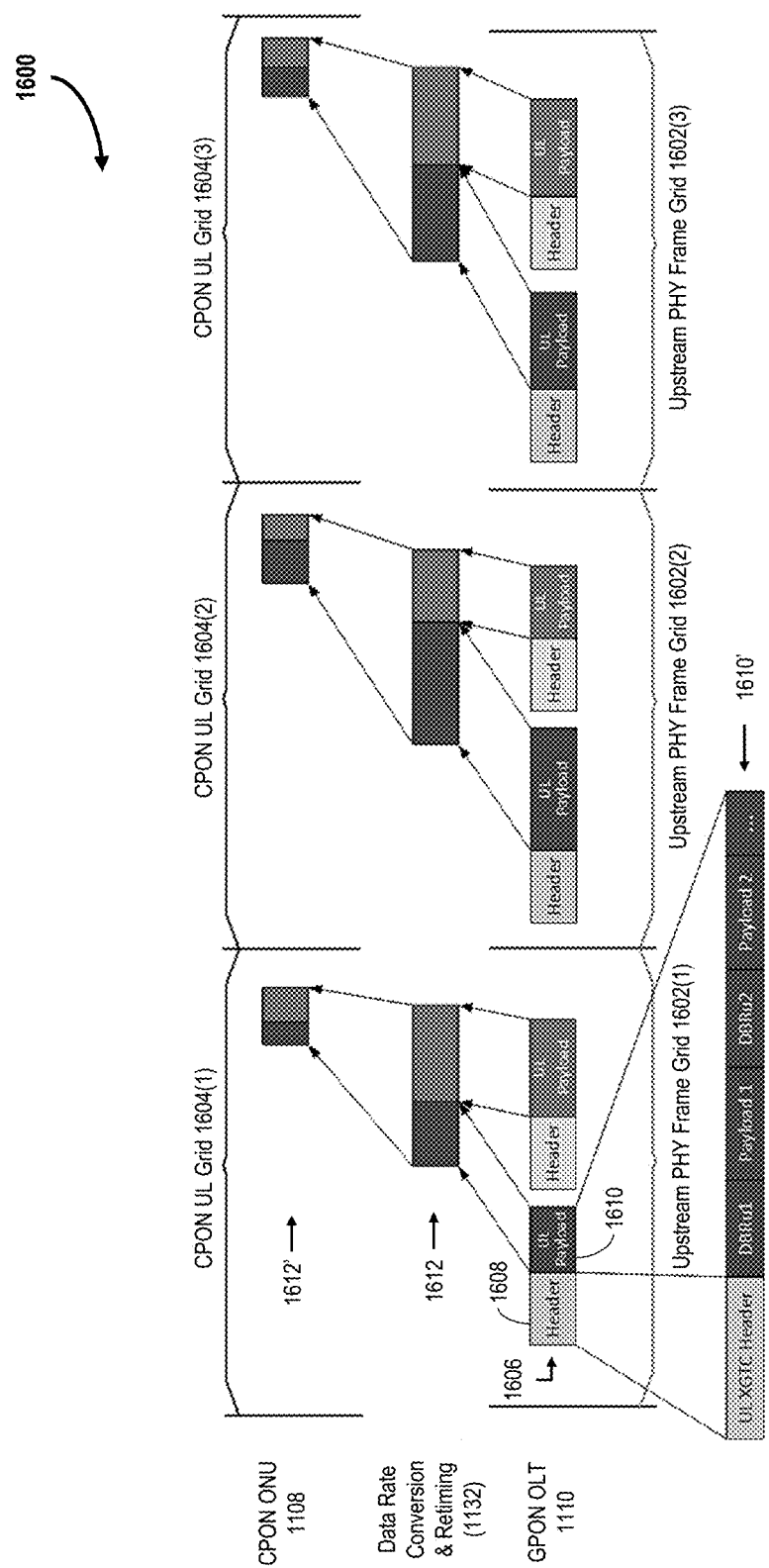

FIG. 16 illustrates an exemplary coherent backhauling data re-encapsulation scheme for the gigabit passive optical network uplink of the diagram depicted in FIG. 14.

Figure 17:
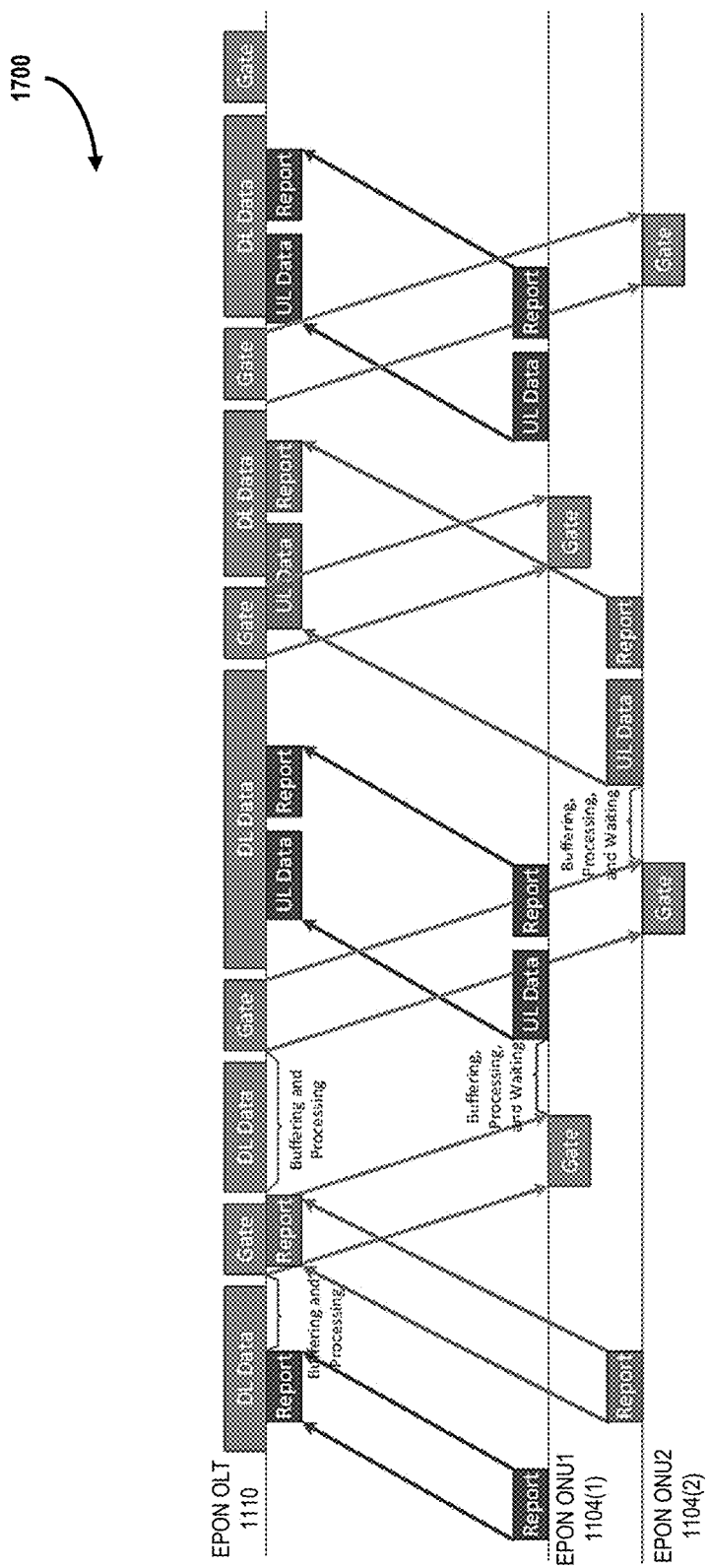

FIG. 17 illustrates an exemplary timing flow diagram for bi-directional data transmission in an ethernet passive optical network, in accordance with an embodiment.

Figure 18:
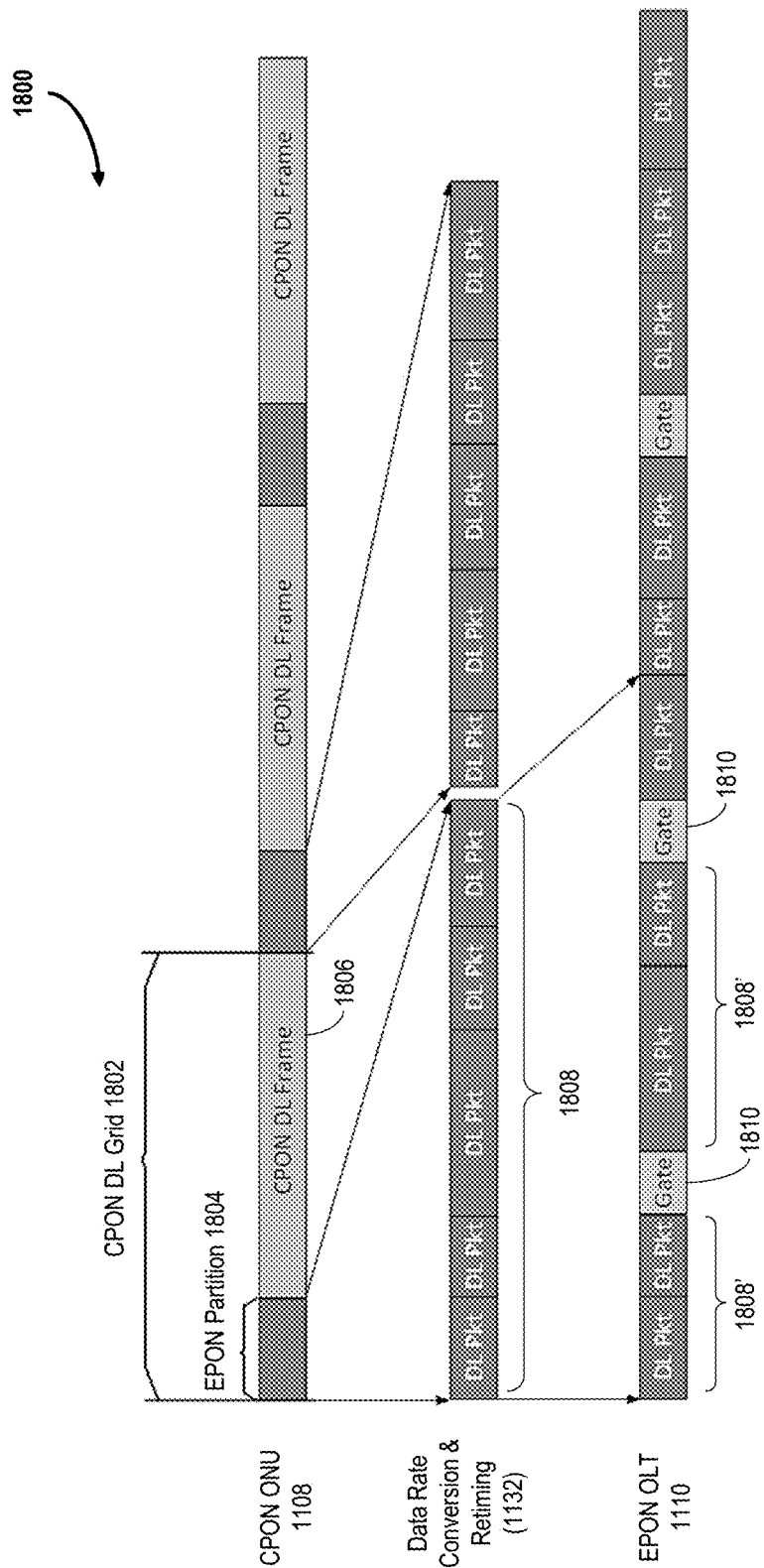

FIG. 18 illustrates an exemplary coherent backhauling data re-encapsulation scheme for the ethernet passive optical network downlink of the diagram depicted in FIG. 17.

Figure 19A:
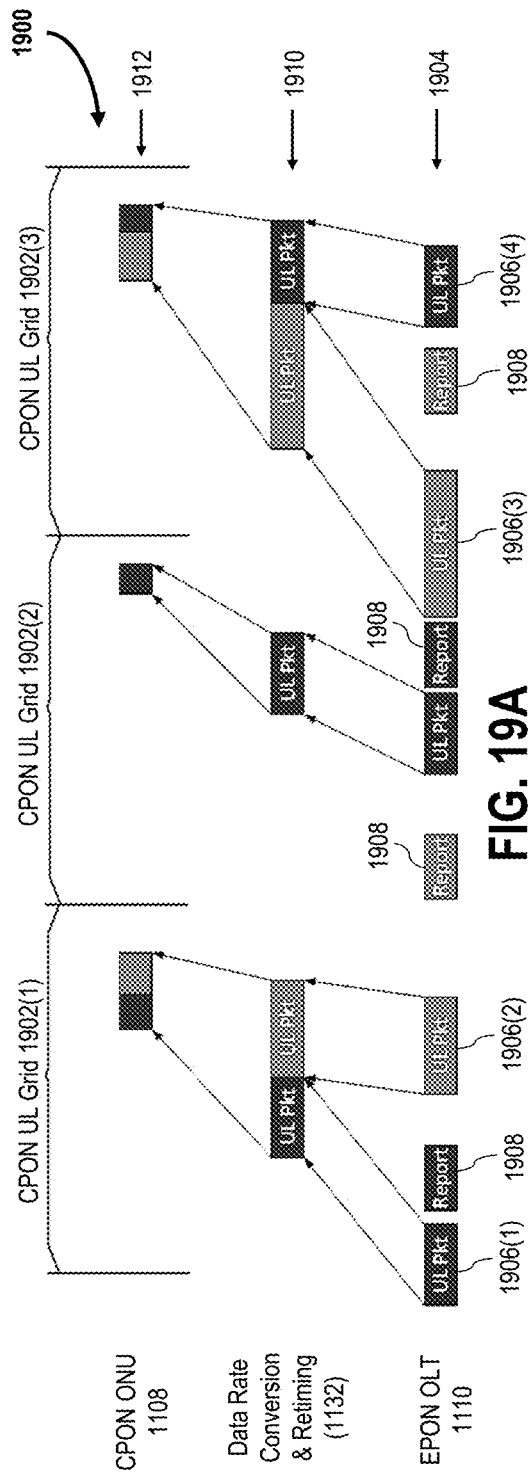
Figure 19B:
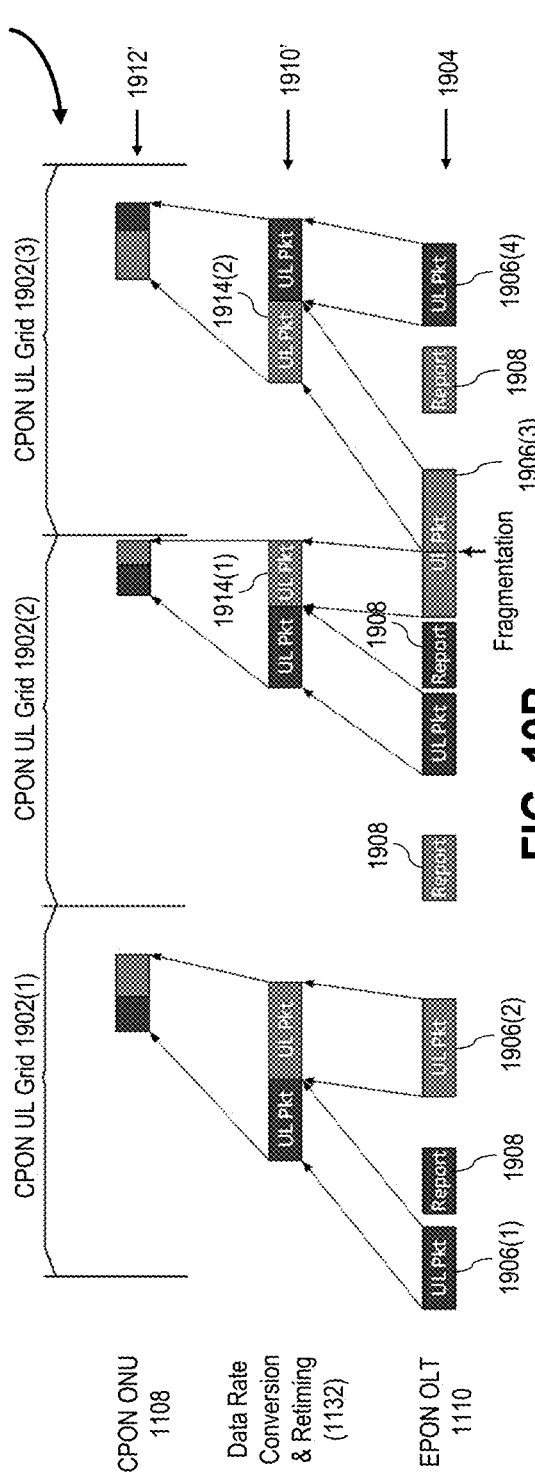

FIGS. 19A-B illustrate exemplary coherent backhauling data re-encapsulation schemes for the ethernet passive optical network uplink of the diagram depicted in FIG. 17.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the term "database" may refer to either a body of data, a relational database management system (RDBMS), or to both, and may include a collection of data including hierarchical databases, relational databases, flat file databases, object-relational databases, object-oriented databases, and/or another structured collection of records or data that is stored in a computer system.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner.

Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, servers, and respective processing elements thereof.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

As described herein, "user equipment," or UE, refers to an electronic device or system utilizing a wireless technology protocol, such as Long Term Evolution (LTE) or WiMAX (e.g., IEEE 802.16 protocols), and may include therein Wi-Fi capability to access and implement one or more existing IEEE 802.11 protocols. A UE may be fixed, mobile, or portable, and may include a transceiver or transmitter-and-receiver combination. A UE may have separate components, or may be integrated as a single device that includes a media access control (MAC) and physical layer (PHY) interface, both of which may be 802.11-conformant and/or 802.16-conformant to a wireless medium (WM).

With respect to the embodiments herein, an optical hub or headend may include at least one modem termination system (MTS), which may include, without limitation, a termination unit such as an optical network terminal (ONT), an optical line terminal (OLT), a Network Termination Unit, a Satellite Termination Unit, a Cable MTS (CMTS), or another similarly-capable termination unit or system. For ease of explanation, all such termination systems/units are collectively referred to herein by the designation "MTS."

As used herein, the term "modem" similarly may include, without limitation, a cable modem (CM), a satellite modem, an optical network unit (ONU), a digital subscriber line (DSL) unit/modem, etc., which are collectively referred to herein as "modems."

As used herein, the term "coherent transceiver," unless specified otherwise, refers to a point-to-point (P2P) or point-to-multipoint (P2MP) coherent optics transceiver having a coherent optics transmitting portion and a coherent optics receiving portion. In some instances, the transceiver may refer to a specific device under test (DUT) for several of the embodiments described herein.

As described herein, a "PON" generally refers to a passive optical network or system having components labeled according to known naming conventions of similar elements that are used in conventional PON systems. For example, an OLT may be implemented at an aggregation point, such as a headend/hub, and multiple ONUs may be disposed and operable at a plurality of end user, customer premises, or subscriber locations. Accordingly, an "uplink transmission" generally refers to an upstream transmission from an end user to the headend/hub, and a "downlink transmission" generally refers to a downstream transmission from the headend/hub to the end user, which may be presumed to be generally broadcasting continuously (unless in a power saving mode, or the like).

The person of ordinary skill in the art will understand that the term "wireless," as used herein in the context of optical transmission and communications, including free space optics (FSO), generally refers to the absence of a substantially physical transport medium, such as a wired transport, a coaxial cable, or an optical fiber or fiber optic cable.

As used herein, the term "data center" generally refers to a facility or dedicated physical location used for housing electronic equipment and/or computer systems and associated components, e.g., for communications, data storage, etc. A data center may include numerous redundant or backup components within the infrastructure thereof to provide power, communication, control, and/or security to the multiple components and/or subsystems contained therein. A physical data center may be located within a single housing facility, or may be distributed among a plurality of co-located or interconnected facilities. A 'virtual data center' is a non-tangible abstraction of a physical data center in a software-defined environment, such as software-defined networking (SDN) or software-defined storage (SDS), typically operated using at least one physical server utilizing a hypervisor. A data center may include as many as thousands of physical servers connected by a high-speed network.

As used herein, the term "hyperscale" refers to a computing environment or infrastructure including multiple computing nodes, and having the capability to scale appropriately as increased demand is added to the system, i.e., seamlessly provision infrastructure components and/or add computational, networking, and storage resources to a given node or set of nodes. A hyperscale system, or "hyperscaler" may include hundreds of data centers or more, and may include distributed storage systems. A hyperscale system may utilize redundancy-based protection and/or erasure coding, and may be typically configured to increase background load proportional to an increase in cluster size. A hyperscale node may be a physical node or a virtual node, and multiple virtual nodes may be located on the same physical host. Hyperscale management may be hierarchical, and thus the "distance" between nodes may be physical or perceptual. A hyperscale datacenter may include several performance optimized datacenters (PODs), and each POD may include multiple racks and hundreds and thousands of computing and/or storage devices.

Several embodiments are described herein with respect to various components that may be found in conventional cable, wireless/Wi-Fi, and/or optical networks, which may include, without limitation, an ONT or OLT, and an ONU, and may utilize optical protocols such as Data Over Cable Service Interface Specification (DOCSIS), Ethernet PON (EPON), Radio Frequency over Glass (RFoG), Gigabit PON (GPON), and/or Satellite Internet Protocol, without departing from the scope of the embodiments herein.

Communication systems according to the present embodiments may be further configured for x-hauling traffic, satellite operator communications, MIMO communications, microwave communications, and both short- and long-haul coherent optical communications. As used herein, "xHaul" or "X-hauling" refers to any one, or a combination, of front-hauling, backhauling, and mid-hauling.

The embodiments described herein provide innovative systems and methods for integrated termination solutions at downstream communication nodes in coherent optical networks. The present techniques are further advantageously applicable to a number of different architectural configurations and different use cases.

Coherent Optical Backhauling

According to the systems and methods described herein, coherent optics technology is leveraged to significantly meet the increasing demand for capacity in the CCAP network paradigm, and particularly with respect to the residential data service tier, thereby providing an improved alternative solution for long-term fiber access connectivity between the hub/headend and the aggregation node. The present embodiments further improve upon existing distributed network topologies by enabling the distributed optical endpoints to intelligently operate as integrated controllers, similar to the capability of the hub controller in the centralized architecture, but effectively for multiple different services (e.g., business, mobile x-haul, various FTTP PONs, etc.) available to the distributed architecture. An example of such an improved distributed architecture topology is described further below with respect to FIG. 2.

Figure 1:
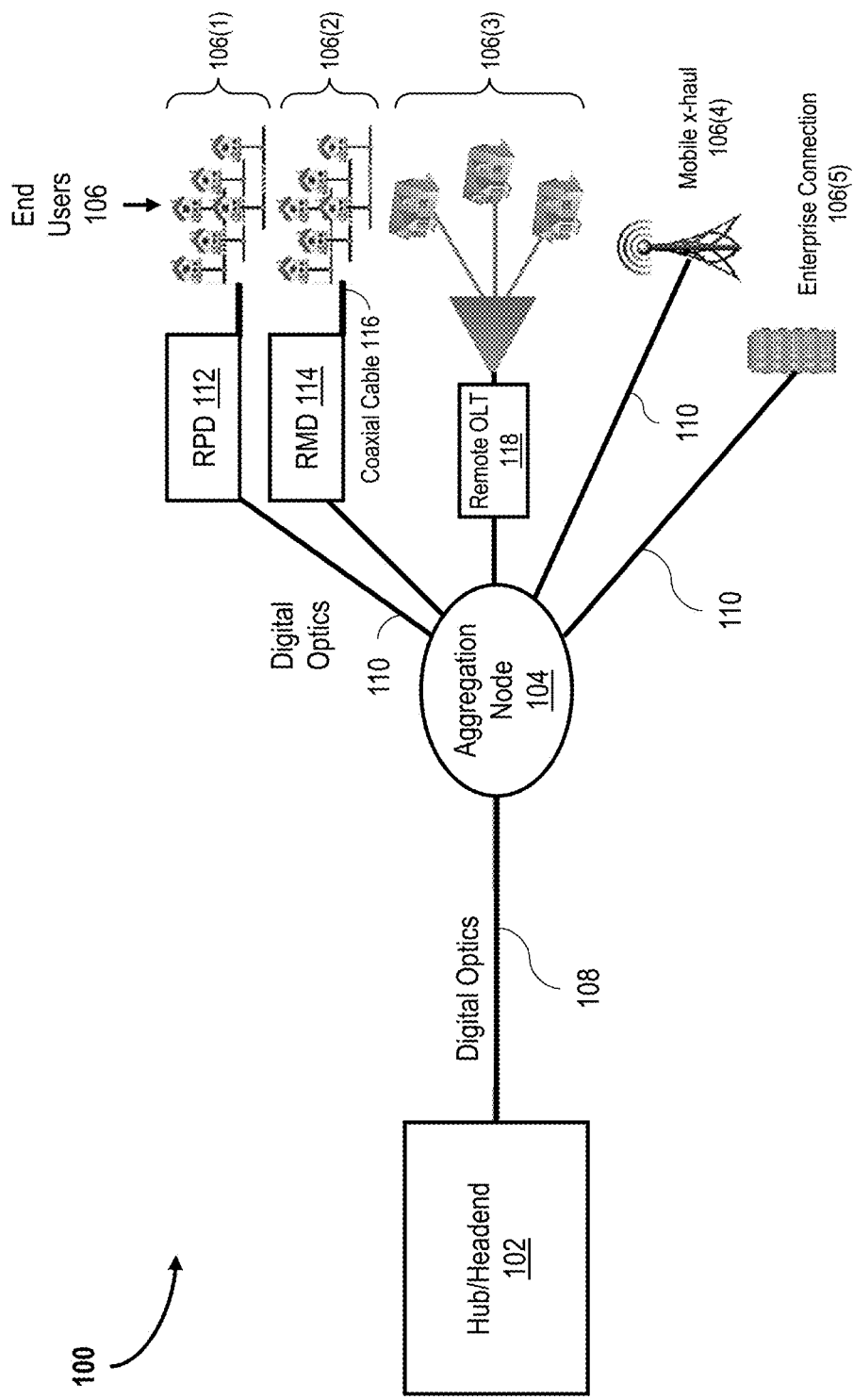
FIG. 1 is a schematic illustration of a conventional optical communication network architecture capable of supporting multiple services.
Figure 2:
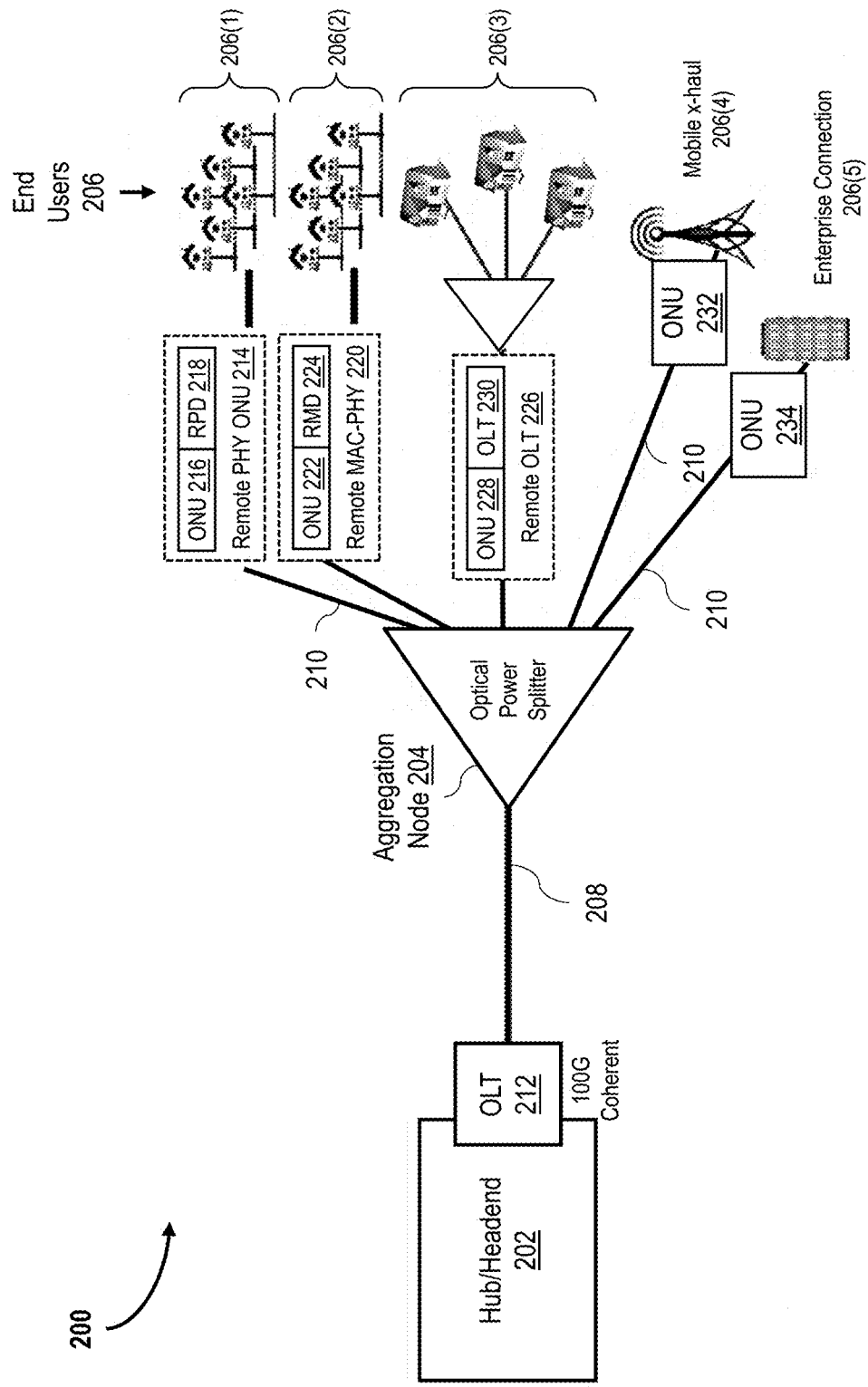
FIG. 2 is a schematic illustration of an exemplary coherent optical communication network for universal aggregation services, in accordance with an embodiment.

FIG. 2 is a schematic illustration of an exemplary coherent optical communication network 200 for universal aggregation services. In the exemplary embodiment depicted in FIG. 2, network 200 is similar to architecture 100, FIG. 1, in a number of aspects, and therefore similar components are referenced by the same respective labels. For example, network 200 similarly includes a hub/headend 202, an aggregation node 204, and a plurality of end users 206 in operable communication over a first optical communication medium 208 (e.g., long fiber from hub-to-node) and a plurality of second optical media 210 (e.g., short fibers from node-to-optical-endpoints).

In this example, hub/headend 202 is illustrated to include a central OLT 212 (e.g., a 100G coherent OLT), and aggregation node 204 is depicted as an optical power splitter. Accordingly, in an exemplary embodiment, implementation of an optical power splitter at aggregation node 204 enables wavelength-independent operation. In some cases, the optical power splitter may be cascaded among several devices (e.g., x2, x5, etc.).

In the exemplary embodiment, network 200 is further depicted, for simplicity of explanation, according to the PON topology approach. That is, the innovative principles herein are more readily apparent from an exemplary PON architecture, given its greater operational simplicity, network reliability, scalability for future capacity demand, and statistical gain per child node in comparison with the AON topology. In an exemplary embodiment, network 200 may further utilize a coherent PON (CPON) architecture, which particularly realizes an ultra-high data rate per wavelength, and over a much longer transmission distance with much higher split ratio (e.g., 1:32, or 1:4 followed by 1:8, etc.).

Network 200 differs though, from architecture 100, in that network includes an integrated ONU termination solution at each child node. For example, instead of RPD 112, network 200 may include an integrated RPD-ONU 214 having an ONU portion 216 and an RPD portion 218 which coordinate for communication with end users 206(1). Similarly, instead of RMD 114, network 200 may include an integrated RMD-ONU 220 having an ONU portion 222 and an RMD portion 224 which coordinate for communication with end users 206(2), and instead of remote OLT 118, an integrated remote OLT-ONU 226 having an ONU portion 228 and an OLT portion 230 which coordinate for communication with end users 206(3). Likewise, network 200 further may include one or more of an integrated x-haul ONU 232 (e.g., for end user(s) 206(4)), and an integrated enterprise ONU 234 (e.g., end user(s) 206(5)).

Thus, similar to other PON architectures (e.g., end users 106(3) and architecture 100, FIG. 1), the CPON architecture of network 200 includes a central OLT 212 in hub/headend 202 for communication with the respective CPON ONUs that connected to the multiple different edge devices for the different respective use cases. Different though, from conventional CPONs, the improved topology of network 200 implements innovative integrated ONU terminations (e.g., integrated ONUs 214, 220, 226, 232, 234) for each respective edge service use case.

Exemplary architectures of coherent hub-to-node networks and systems are described in greater detail in U.S. Pat. No. 10,200,123, the disclosure of which is incorporated by reference herein. Additionally, the person of ordinary skill in the art will understand that network 200 is simplified for ease of explanation, does not necessarily illustrate all components that may be implemented within a hub and/or fiber node.

As described further below with respect to FIGS. 3-8, the integrated solutions of the present embodiments significantly reduces the power and space requirements needed for the remote hardware distribution footprint (sometimes referred to as "the clamshell"), while also reducing both the hardware and operational costs to achieve at least the same level of functionality. The integrated solutions herein though, yield further operational improvements for low-latency service offerings through the innovative coordinated and cooperative operation between different schedulers. The following embodiments are described, by way of example and not in a limiting sense, with respect to use cases for distributed CCAP architecture (DCA) topologies and remote PONs.

Figure 3:
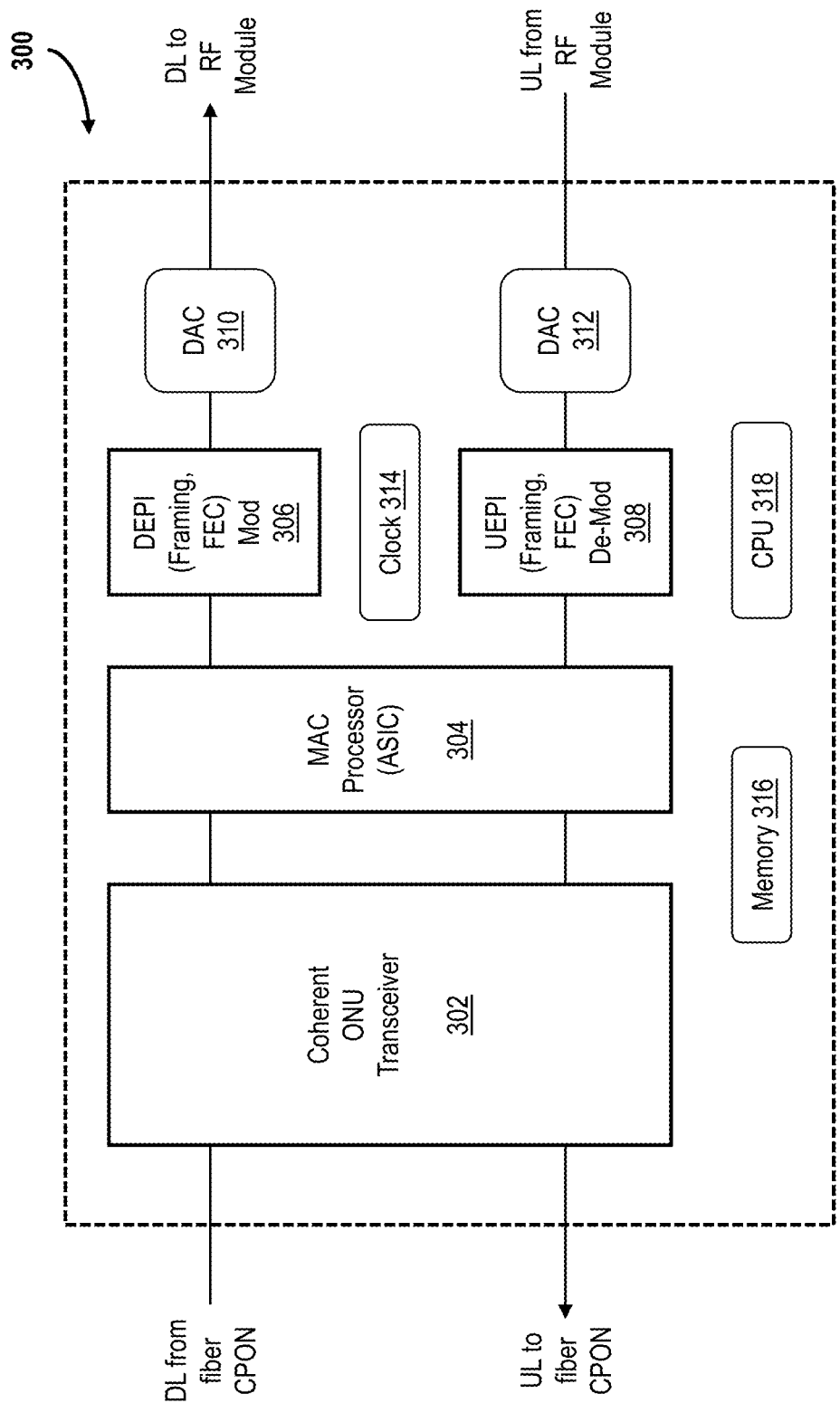
FIG. 3 is a schematic illustration of an exemplary integrated optical network unit, in accordance with an embodiment.

FIG. 3 is a schematic illustration of an exemplary integrated ONU 300. Integrated ONU 300 is similar in many aspects to integrated RPD-ONU 214, FIG. 2, and is representative of a CPON ONU-plus-RPD module in the remote PHY DCA use case. In an exemplary embodiment, integrated ONU 300 integrates a CPON ONU coherent transceiver 302, by way of a MAC processor 304, which is in turn in operable communication with a downstream external PHY interface (DEPI) modulator 306 and an upstream external PHY interface (UEPI) demodulator 308. In an exemplary embodiment, MAC processor 304 is an application specific integrated circuit (ASIC).

In an embodiment, DEPI modulator 306 performs framing and forward error correction (FEC) on the DL signal from MAC processor 304, and UEPI demodulator 308 performs framing and FEC on the UL signal to MAC processor 304. In this exemplary remote PHY use case, the modulated DL signal from DEPI modulator 306 is passed through a digital-to-analog converter (DAC) 310 prior to transport to the RF module in communication with the respective cable RF-based end user (e.g., end user 206(1)). In a similar manner, analog cable RF UL signals from respective end users are converted by an analog-to-digital converter (ADC) 312 before reception and digital demodulation by UEPI demodulator 308.

In exemplary downstream operation of integrated ONU 300, optical signal packet traffic arrives from the CCAP Core and CPON OLT (e.g., central OLT 212, FIG. 2), through the fiber CPON infrastructure (e.g., from second optical communication medium 210, FIG. 2), at a receiver portion (not separately shown) of coherent ONU transceiver 302, followed by the MAC layer of MAC processor 304. In further exemplary operation, DEPI modulator 306 functions to (i) terminate DEPI framing, (ii) extract the payload from the terminated signal, (iii) modulate and/or perform FEC on the extracted payload, and (iv) transmit the modulated/corrected signal, after conversion by DAC 310, out to the RF module. In the case where the RF module is disposed within the cable paradigm, an analog RF signal and the RF module may be further transmitted by way of a cable interface to the respective receiving devices of end users 206(1) (e.g., cable modems).

In exemplary upstream operation of integrated ONU 300, UL RF signals are received from the RF module of the coaxial network (e.g., in the cable paradigm) at ADC 312, which digitizes the received analog RF signals. UEPI demodulator 308 then (i) demodulates the digitized signals, (ii) extracts frames from the FEC payload (e.g., DOCSIS frames, in this example), and (iii) encapsulates the extracted DOCSIS frames into UEPI framing for reception by MAC processor 304. The framed and processed UL signals may then be transmitted to the fiber CPON and the CCAP Core from an upstream burst transmitter portion (not separately shown) of coherent ONU transceiver 302.

In the exemplary embodiment, integrated ONU 300 further includes a local clock unit 314, a local memory 316, and a local central processing unit (CPU) 318, all of which may thus be commonly shared between the ONU portion (e.g., coherent ONU transceiver 302) and the RPD portion (e.g., DEPI modulator 306, UEPI demodulator 308) control planes for integrated and coordinated operation therebetween. More particularly, according to the present integrated ONU configuration, clocking and timing information needed for RPD operation and scheduling by local clock unit 314 may be extracted from the ONU signals from coherent ONU transceiver 302. Additionally, local CPU 318 may then be used within the RPD control planes (e.g., by DEPI modulator 306, UEPI demodulator 308), and local memory 316 advantageously functions to perform buffering for upstream signals processed through integrated ONU 300.

According to the innovative architectural configuration and functional operation of integrated ONU 300, by combining ONU and RPD functionality within a single, intelligent, integrated device, integrated ONU 300 is advantageously enabled to significantly reduce latency, in comparison with conventional techniques that require separate ONUs and RPDs. That is, integrated ONU 300 does not merely combine ONU elements with RPD elements in a single device to conserve space; indeed, through the coordinated operation of shared local clock unit 314, local memory 316, and local CPU 318, integrated ONU 300 intelligently integrates and coordinates ONU operation with RPD operation.

More particularly, according to this innovative embodiment, intelligent integration is achieved by providing coherent ONU transceiver 302 with knowledge of RPD operation of DEPI 306, UEPI 308, and vice versa. RPD scheduling may thus be effectively coordinated, through this shared intelligence between the integrated components, in a manner comparable to that realized by a centralized, less distributed network architecture, thereby significantly reducing the latency challenges experienced by conventional distributed architectures.

Additionally, by sharing several common local components (e.g., local clock unit 314, local memory 316, local CPU 318) between the respective ONU and RPD portions, integrated ONU 300 further reduces not only the footprint of having the ONU separate from the RPD, but also the overall hardware cost thereof. That is, redundant electronic elements are no longer needed in this innovative integrated design. Similar advantages are achieved in the RMD use case, as described further below with respect to FIG. 4.

Figure 4:
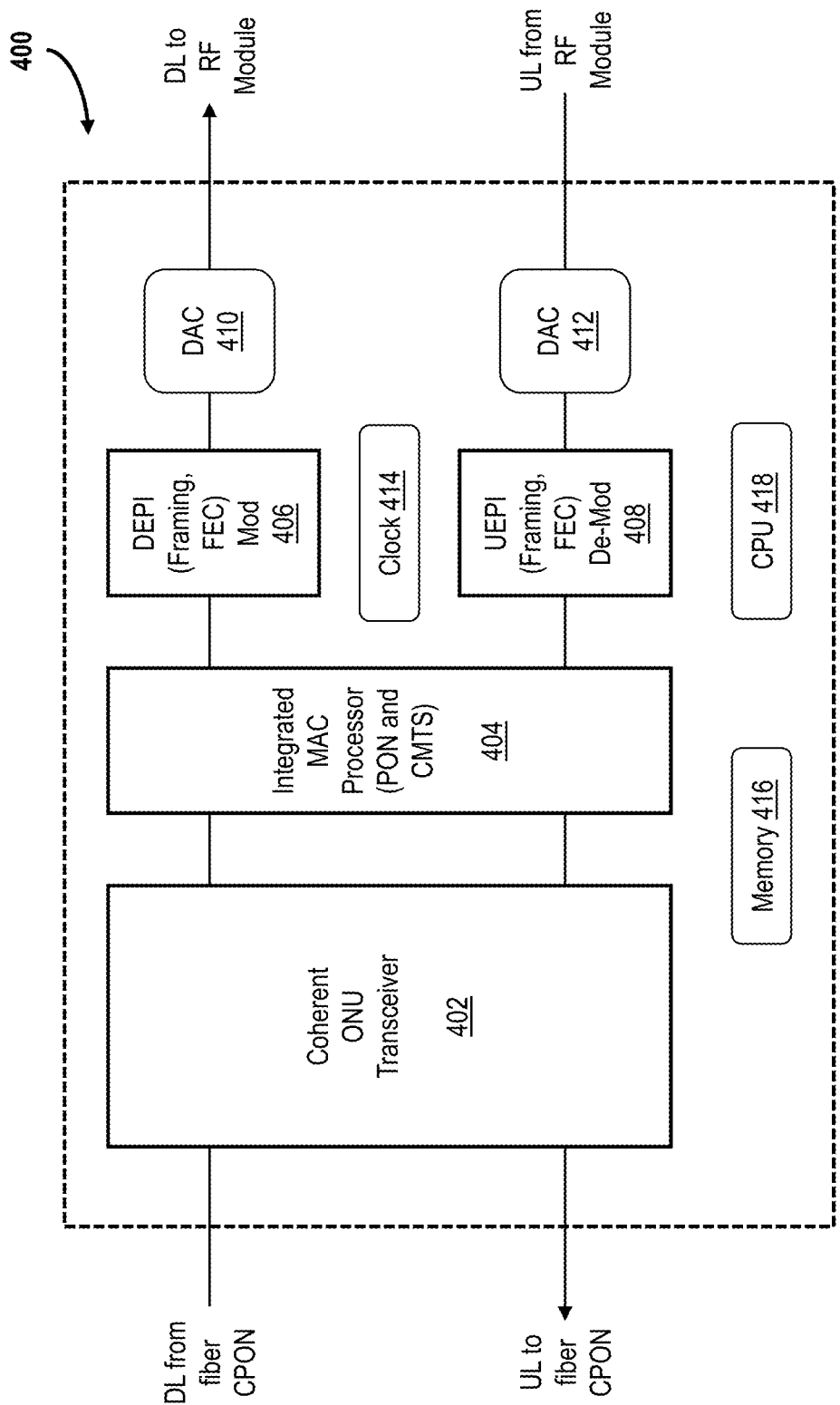
FIG. 4 is a schematic illustration of an alternative integrated optical network unit, in accordance with an embodiment.

FIG. 4 is a schematic illustration of an alternative integrated ONU 400. That is, integrated ONU 400 is similar in many aspects to integrated ONU 300, FIG. 3, but represents an alternative CPON ONU-plus-RMD module in the remote PHY DCA use case, for example, similar to integrated RMD-ONU 220, FIG. 2. Similar to integrated ONU 300 integrated ONU 400 includes an ONU coherent transceiver 402, and a MAC processor 404 in operable communication with a DEPI modulator 406 and a UEPI demodulator 408. Also similar to integrated ONU 300, integrated ONU 400 further includes a DAC 410, an ADC 412, a shared local clock unit 414, a shared local memory 416, and a shared local CPU 418.

In the exemplary embodiment depicted in FIG. 4 though, integrated ONU 400 differs from integrated ONU 300, in that MAC processor 404 is integrated to include both of a PON scheduler and an MTS/CMTS scheduler on the same chip. In exemplary operation of integrated ONU 400 is otherwise similar to that described above with respect to integrated ONU 300. It may be noted though, that in comparison with integrated ONU 300, integrated ONU 400 may utilize lower speed DCA interfaces to enable higher-speed CPON ONU connection through respective data rate mapping and conversion functions of the several components thereof.

Figure 5:
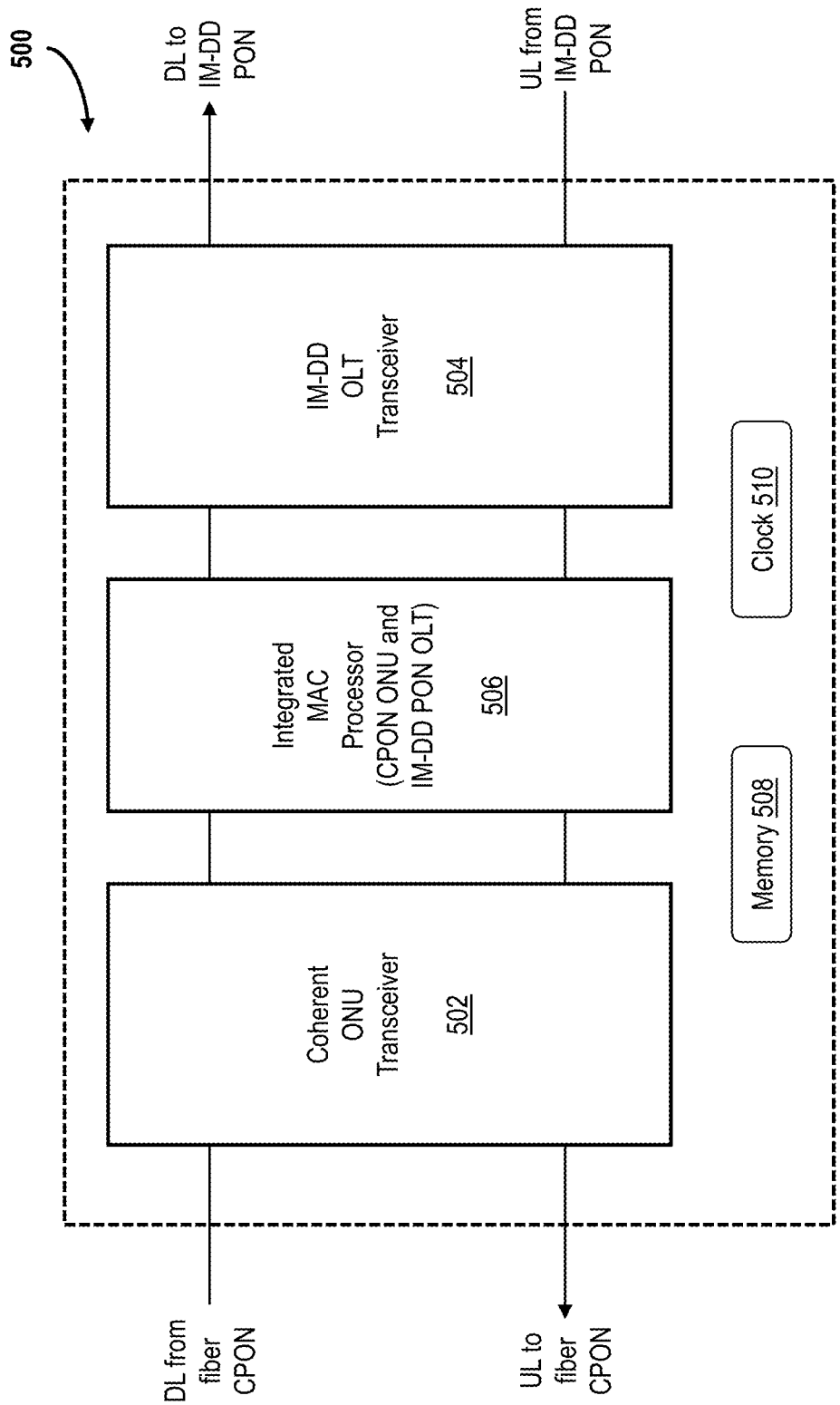
FIG. 5 is a schematic illustration of an exemplary integrated transceiver for an optical network, in accordance with an embodiment.

FIG. 5 is a schematic illustration of an exemplary integrated transceiver 500 for an optical network. In the exemplary embodiment depicted in FIG. 5, integrated transceiver 500 represents a dual-transceiver configuration in a CPON network for intelligent coordinated scheduling with a remote intensity modulation/direct detection (IM-DD) PON (e.g., end users 206(3), FIG. 2). In an embodiment, integrated transceiver 500 includes a coherent ONU transceiver portion 502 and an IM-DD transceiver portion 504, and an integrated MAC processor 506 disposed therebetween. In an exemplary embodiment, integrated transceiver 500 further includes a local memory 508 and a local clock unit 510 accessible to, and shared between, respective transceiver portions 502, 504.

In exemplary operation of integrated transceiver 500, packet traffic arrives from the CPON OLT (e.g., CPON OLT 608, described further below with respect to FIG. 6) on the receiver portion (not separately shown) of coherent ONU transceiver portion 502. The MAC layer of MAC processor 506 then integrates the respective MAC functionality of both of coherent ONU transceiver portion 502 (e.g., from the CPON) and IM-DD OLT transceiver portion 504 (e.g., from the lower-speed IM-DD PON). Through the intelligent integration of both transceiver portions 502, 504 for the respective CPON and IM-DD PON, integrated transceiver 500 advantageously enables functionality as a single PON, thereby significantly reducing the request/grant and polling cycle from the different PON systems.

In further exemplary operation of integrated transceiver 500, integrated MAC processor 506 advantageously functions as a key traffic scheduler to bridge together the CPON and the IM-DD PON. In the downstream direction, this unique dual-transceiver configuration enables the CPON payload to be encoded, modulated, and transmitted to the IM-DD PON optical node distribution system according to an intelligently-scheduled operation, that is, received by an IM-DD ONU (e.g., IM-DD ONU 604, FIG. 6, below), or multiple IM-DD ONUs, since IM-DD OLT transceiver portion 506 may be configured to support multiple IM-DD ONUs.

More particularly, similar to the RPD and RMD embodiments described above, both of transceiver portions 502, 504 intelligently share knowledge with each other through the shared local memory 508 and shared clock unit 510, as well as the operation of integrated MAC processor 506 for optimization of traffic scheduling between the different PON systems. Integrated MAC processor 506 thus serves as the "brain in the middle," able to "see" the scheduling needs of the traffic from both respective PON systems, and then optimize the traffic in an intelligent manner by leveraging the high-bandwidth capacity of the CPON. In this manner, integrated transceiver 500 effectively enables centralized scheduling of the IM-DD PON traffic at the headend, instead of at each remote IM-DD OLT, as is conventionally required. Thus, whereas conventional systems required space two separate schedulers, integrated transceiver 500 effectively implements a single scheduler, thereby significantly reducing collisions, delays, and other scheduling conflicts that frequently arise from the implementation of two different schedulers for the CPON and IM-DD PON, respectively.

An integrated transceiver according to the present configuration therefore realizes still further advantages in relation to conventional dynamic bandwidth allocation (DBA) MAC designs, which require the respective OLTs to grant an upstream bandwidth to each remote ONU in a reactive way, i.e., based on active monitoring of the upstream traffic and the buffer status report (BSR) of each ONU. In contrast, the intelligent coordination functionality of integrated transceiver 500 enables the efficient scheduling of traffic between the different PON systems in a proactive manner.

For example, in the upstream direction, IM-DD traffic may be scheduled to the CPON in the same optimized manner as the downstream traffic to the IM-DD PON, but through the opposite signal path in comparison with the downstream CPON traffic. The upstream IM-DD PON traffic may still be effectively scheduled in a proactive manner according to the centralized scheme, e.g., at the headend, instead of the conventional reactive scheduling required by conventional distributed architecture topologies that require separate schedulers for each different type of PON.

In alternative operation, integrated transceiver 500 may utilize, within integrated MAC processor 506, a pre-determined, or fixed, bandwidth allocation scheme for the CPON side, and conventional DBA scheme for the IM-DD PON. According to this alternative approach, no additional modification to the DBA of the IM-DD PON is needed. For example, when arriving at CPON ONU transceiver portion 502, the data flow from different IM-DD PONs may simply wait (e.g., in local memory 508) for the next available pre-determined or fixed time slot to be sent to the CPON OLT through the coherent link thereof. According to this alternative approach, the impact from the CPON DBA to the IM-DD PON DBA is significantly minimized. In some embodiments, implementation of this alternative approach may further consider the trade-off between the impact from the CPON DBA in relation to desired efficiency of the CPON bandwidth utilization.

According to this alternative operation or approach, in the case of a low-latency service, higher priority may be assigned to bandwidth that is determined to be not shared, and without requiring conventional request-grant processing. Through implementation of this alternative mechanism, an even greater balance between latency and bandwidth use efficiency may be achieved within the context of the significantly greater capacity provided by CPON, which is now effectively and intelligently integrated with the IM-DD PON allocation. Conventional techniques that do not intelligently integrate the different PONs are unable to leverage this CPON capacity for the IM-DD PON paradigm.

Figure 6:
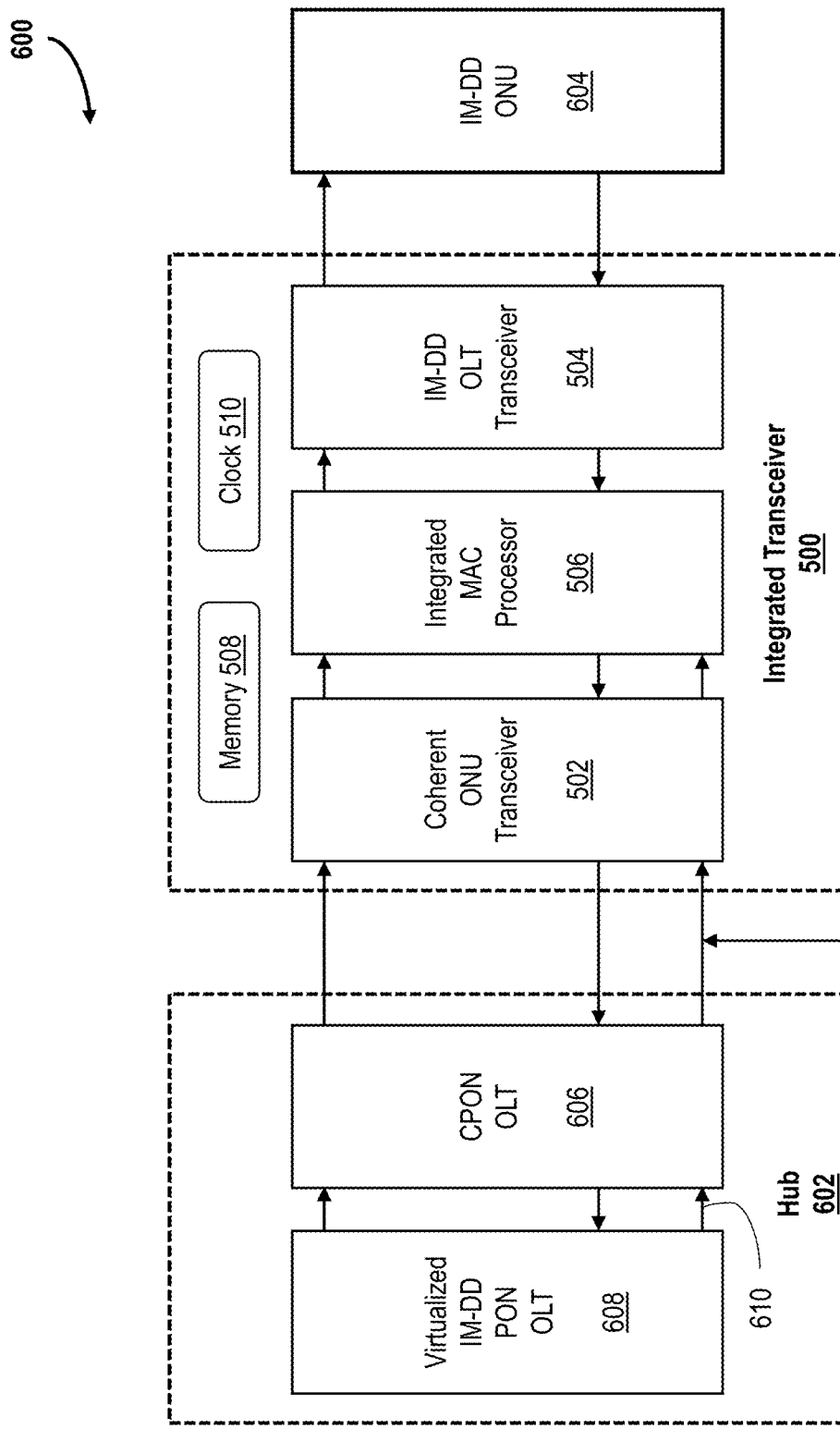
FIG. 6 is a schematic illustration of an exemplary optical network architecture implementing the integrated transceiver depicted in FIG. 5.

FIG. 6 is a schematic illustration of an exemplary optical network architecture 600 implementing integrated transceiver 500, FIG. 5. In an exemplary embodiment, architecture 600 disposes integrated transceiver 500 between a coherent optical hub 602 and an IM-DD ONU 604. In the example depicted in FIG. 6, coherent optical hub 602 is configured for a CPON system, and includes a CPON OLT 606 and a virtualized IM-DD PON OLT 608 to implement cooperative scheduling for the enablement of CPON backhauling, such as in the case of FTTP service to an IM-DD PON (e.g., end users 206(3), FIG. 2).

For ease of explanation, a single IM-DD ONU 604 and a single virtualized IM-DD PON OLT 608 are depicted in FIG. 6. The person of ordinary skill in the art will understand that this depiction is by way of example, and is not intended to be limiting. As described above, IM-DD OLT transceiver portion 504 may be configured to support multiple IM-DD ONUs 604. Similarly, virtualized IM-DD PON OLT 608 may represent a plurality of multiple virtual IM-DD PONS.

In exemplary operation of architecture 600, integrated transceiver 500 functions according to at least one of the alternative operational embodiments described above with respect to FIG. 5, and virtualized IM-DD PON OLT 608 is configured to translate its cooperative scheduling information, as well as other control messages, to CPON OLT 606, by way of a dedicated control channel 610, as cooperative scheduling and control information 612 (e.g., information and/or messages relating to operation, administration, management, and synchronization). According to this innovative configuration of architecture 600, cooperative scheduling and control information 612 may be effectively exchanged between virtualized IM-DD PON OLT 608 and coherent ONU transceiver portion 502.

According to the advantageous configuration of architecture 600, the CPON effectively functions as a transparent network, or "pipe," for the IM-DD PON (e.g., IM-DD ONUs 604). Nevertheless, this innovative configuration of architecture 600 should not be confused with mere tunneling; as described above, the present embodiments advantageously leverage the shared knowledge of transport between the two different PON systems to enable new capabilities for CPON backhauling.

In some embodiments, much of the control functionality of the MAC layer may be remotely processed at coherent hub 102, for example, through network functioning virtualization (NFV). Accordingly, any required messages may then be relayed, as needed, from the coherent ONU transceiver portion 502 (i.e., as the CPON ONU) to IM-DD OLT transceiver portion 504. As described above with respect to FIG. 5, two separate schedulers are not needed for the two different PON systems. Integrated MAC processor 506 is advantageously enabled to utilize cooperative scheduling and control information 612 from the "bigger brain" of CPON OLT 606, which is now transparent to the "smaller brain" of integrated MAC processor 506.

Therefore, according to the exemplary configuration and operation of architecture 600, a cooperative scheduling solution is provided to seamlessly coordinate the timing and DBA of the CPON with the IM-DD PON, thereby enabling the higher bandwidth CPON to become a transparent medium to realize backhaul and efficient dataflow between the virtual IM-DD OLT and remote IM-DD ONUs. In comparison with conventional PON systems, the present systems and methods realize additional advantages, such as the capability for expansion to build developing and future converged networks, for example, utilizing virtual CMTS and/or virtual DU.

According to the present embodiments, by implementing integrated transceiver 500 within the intelligent and coordinated operation of architecture 600, integrated transceiver 500 effectively serves as an extension of both PON systems. Whereas conventional techniques are limited to transmission distances between 20 and 50 km, systems and methods according to the present embodiments are capable of achieving CPON backhauling for transmission distances of up to 80 km or more.

Additionally, the embodiments described above illustrate an exemplary integration strategy for particular end points (e.g., RPD, RMD, remote OLT, IM-DD PON, etc.). The person of ordinary skill in the art though, after reading and comprehending the present description and accompanying illustrations, will understand how the principles described herein are further applicable to different endpoints, which may employ different respective integration strategies, including without limitation, endpoints or ONUs supporting long term evolution (LTE) x-hauling, DOCSIS, enterprise connectivity, etc. it will be further understood that the embodiments herein are described, by way of example and not in a limiting sense, with respect to single distinct ONU endpoints; one ONU, however, may be configured to support multiple ports within the same ONU device, without departing from the scope herein.

The comparative latency reduction advantages of the present systems and methods are described further below with respect to FIGS. 7 and 8. More particularly, FIG. 7 illustrates a message flow case according to a conventional distributed CPON/IM-DD topology, and FIG. 8 illustrates a message flow case utilizing the integrated dual-PON systems and methods described above.

Figure 7:
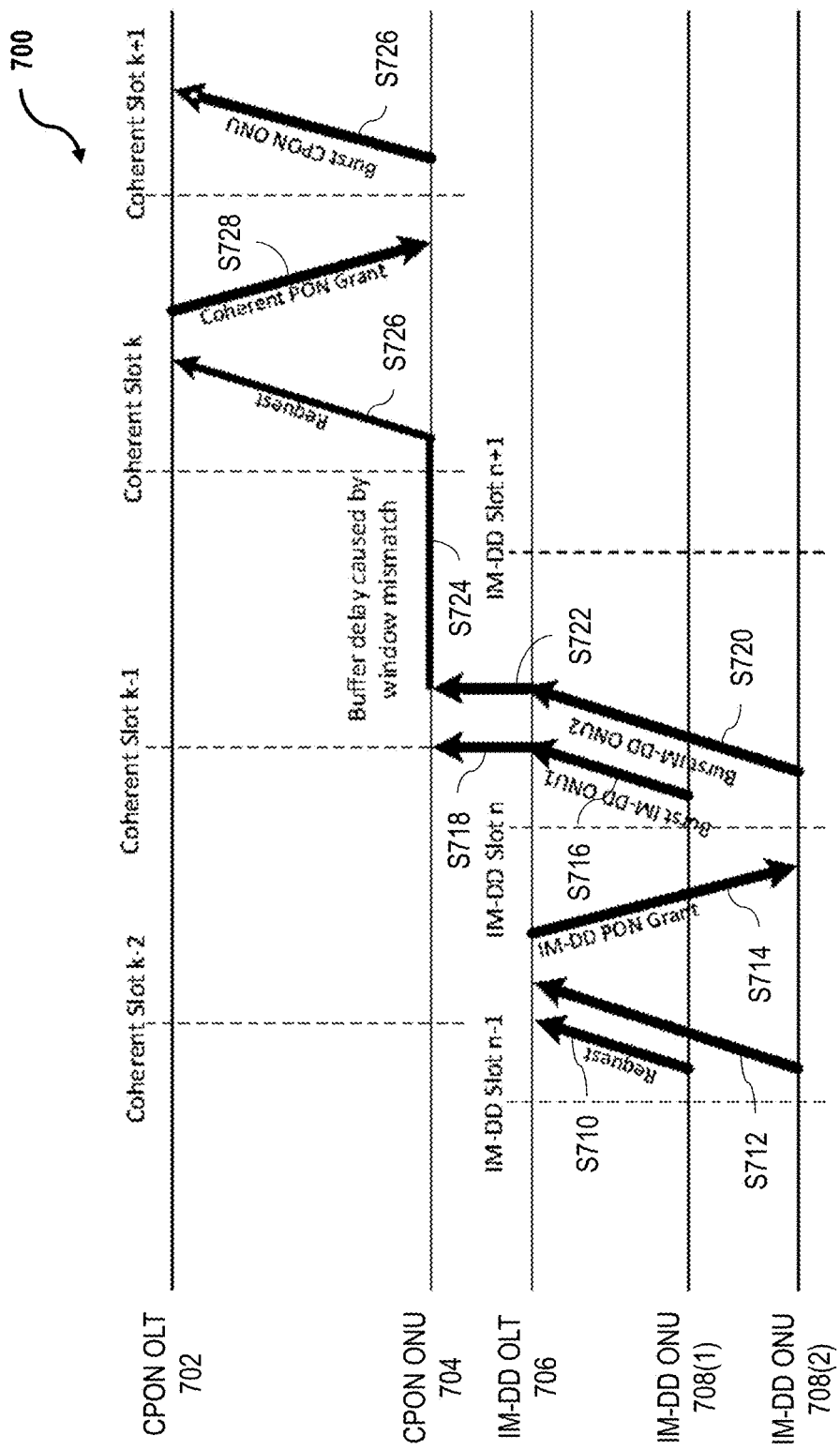
FIG. 7 is message flow sequence diagram according to a conventional backhauling process.
Figure 8:
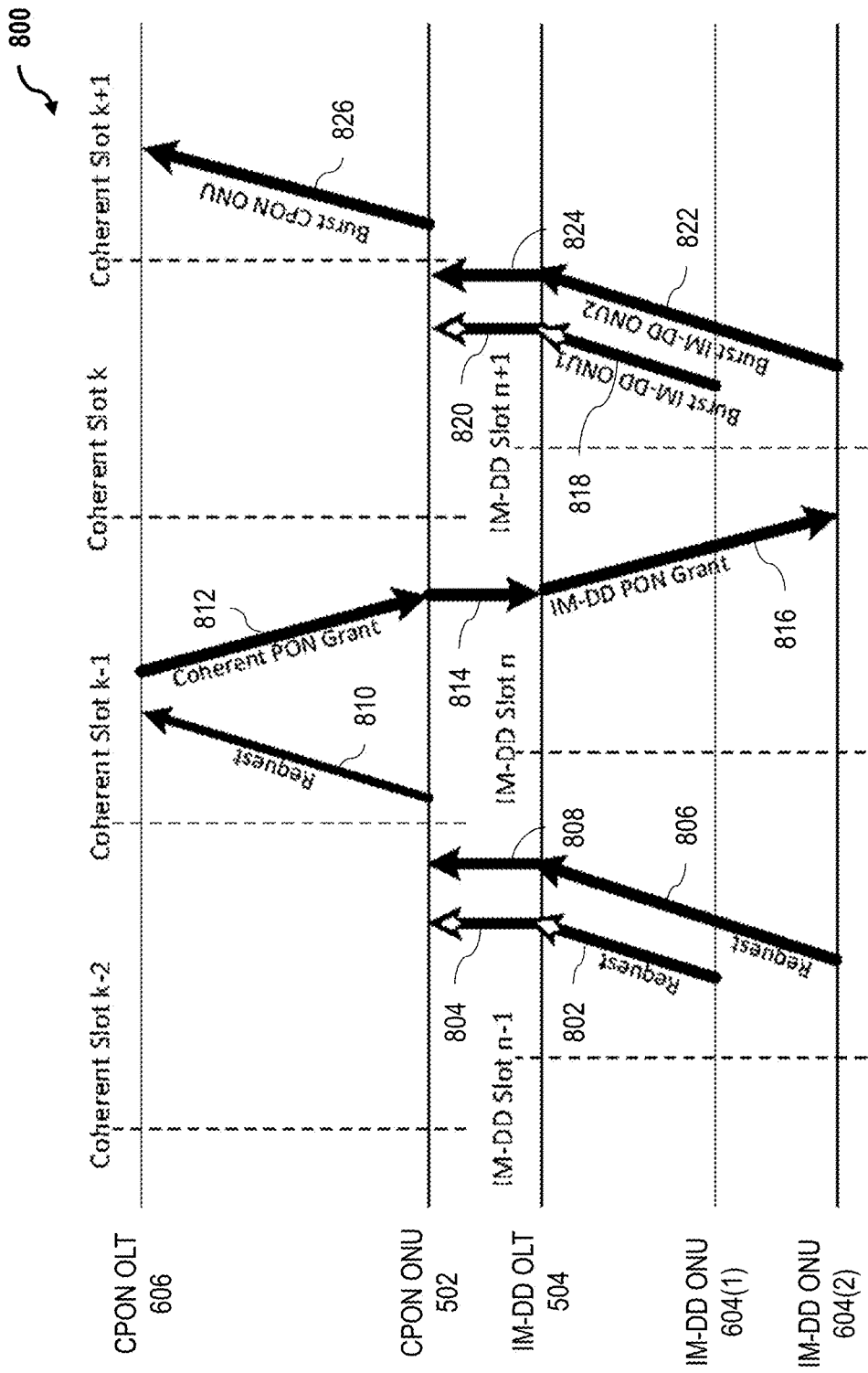
FIG. 8 is message flow sequence diagram according to an exemplary backhauling process for the optical network architecture depicted in FIG. 6.

FIG. 7 is message flow sequence diagram according to a conventional backhauling process 700. In the example depicted in FIG. 7, process 700 is implemented with respect to a conventional (i.e., non-integrated) CPON OLT 702, a conventional CPON ONU 704, a conventional remote IM-DD OLT 706, a first remote IM-DD ONU 708(1), and a second remote IM-DD ONU 708(2). According to this conventional configuration, CPON ONU 704 and remote IM-DD 706 are separate and distinct components, require separate schedulers, and do not share a common integrated MAC processor.

Process 700 begins at step S710, in which first remote IM-DD ONU 708(1) sends a grant request to IM-DD OLT 706. In step S712, second remote IM-DD ONU 708(2) sends a grant request to IM-DD OLT 706. In step S714, IM-DD OLT 706 provides an IM-DD PON grant to second remote IM-DD ONU 708(2). In step S716, first remote IM-DD ONU 708(1) sends an IM-DD burst to IM-DD OLT 706, which, in step S718, is received by CPON ONU 704. In step S720, second remote IM-DD ONU 708(2) sends an IM-DD burst to IM-DD OLT 706, which, in step S722, is also received by CPON ONU 704.

In step S724, CPON ONU 704 experiences a buffer delay caused by a window mismatch between respective IM-DD timing slots $n_i$ and coherent timing slots $k_j$. In step S726, CPON ONU 704 forwards the request to CPON OLT 702, and in step S728, CPON OLT 702 provides a CPON grant to CPON ONU 704. In step S730, CPON ONU 704 sends a CPON burst to CPON OLT 702. As can be seen from the message flow sequence of process 700, when the CPON and IM-DD PON are not well coordinated, as in the conventional scheme, window mismatches result, thereby creating extra delays for the flow of information transferred between the CPON and the IM-DD PON, which is particularly unsuitable for services requiring low-latency.

FIG. 8 is message flow sequence diagram according to an exemplary backhauling process 800 for optical network architecture 600, FIG. 6. More specifically, backhauling process 800 illustrates the improved timing results achieved according to the present systems and methods for a similar case of near-simultaneous grant requests from multiple IM-DD ONUs. In the exemplary embodiment depicted in FIG. 8, backhauling process 800 is depicted as being implemented with respect to several elements of architecture 600, including CPON OLT 606, coherent ONU transceiver 502 (e.g., CPON ONU), IM-DD OLT transceiver portion 504 (e.g., IM-DD OLT), and first and second respective IM-DD ONUs 604(1), 604(2).

Process 800 begins at step 802, in which first IM-DD ONU 604(1) sends a grant request to IM-DD OLT 504, which is then, in step 804, immediately forwarded to CPON ONU 502 (i.e., through integrated MAC processor 506, FIGS. 5-6). In step 806, second IM-DD ONU 604(2) sends a grant request to IM-DD OLT 504, which is then, in step 808, similarly also immediately forwarded to CPON ONU 502. In step 810, CPON ONU 502 forwards grant request to CPON OLT 606. In step 812, CPON OLT 606 provides a CPON grant to CPON ONU 502, which is then, in step 814, immediately forwarded to IM-DD OLT 504 (i.e., also through integrated MAC processor 506).

In step 816, IM-DD OLT 504 provides an IM-DD PON grant to second IM-DD ONU 604(2). In contrast to process 700, FIG. 7, the message flow sequence depicted in FIG. 8 illustrates that the CPON grant is provided relative to the initial ONU grant request, after the request is transferred from IM-DD OLT to the CPON ONU, and prior to the IM-DD PON grant, which occurs immediately after receipt of the CPON grant.

In step 818, first IM-DD ONU 604(1) sends an IM-DD burst to IM-DD OLT 504, which, in step 820 is immediately received by CPON ONU 502. In step 822, second IM-DD ONU 604(2) also sends an IM-DD burst to IM-DD OLT to, which, in step 824, is also immediately received by CPON ONU 502. In step 826, CPON ONU 502 sends a CPON burst to CPON OLT 606. As can be further seen from the message flow sequence of backhauling process 800, the respective IM-DD bursts from first and second ONUs 604(1), 604(2) occur after both the CPON grant in the IM-DD PON grant have occurred. In contrast, the conventional message flow sequence of conventional process 700, FIG. 7, shows that the IM-DD bursts from the remote IM-DD ONUs occur before the CPON grant, thus giving rise to significant buffer delays.

Accordingly, when an integrated MAC layer (e.g., integrated MAC processor 506) is applied between the present dual-transceiver configuration, intermediate message exchanges from the IM-DD OLT to the CPON ONU, which give rise to buffer delays, may be avoided. Instead, the present systems and methods enable pre-allocation of the CPON request-grant time window, such that the timing gaps created by such buffer delays (e.g., step S724, FIG. 7) are advantageously minimized.

The person of ordinary skill the art will further understand that the term "near-simultaneous" is used with respect to some steps of the respective processes 700, 800 to indicate that some processing delay is expected with regard to the transfer or exchange of data between various architectural components. Nevertheless, according to the present techniques, the data flow is effectively transferred between the CPON and the IM-DD PON in a seamless manner, as if the two different PONs were operating as a single PON.

Thus, in addition to the latency reduction advantages achieved according to backhauling process 800, implementation of the present techniques further realizes further simplification of the integrated MAC, thus rendering deployment of the present systems and methods within existing PON architectures and topologies even more attractive. In some embodiments, each endpoint terminal device in an optical communication system architecture may be replaced by an integrated ONU according to one of the embodiments described herein. In other embodiments, existing optical communication networks may implement the present integrated MAC techniques with respect to individual services of the network (e.g., remote PHY, remote MAC-PHY, CPON backhauling, etc.) as the particular service is added, or upgraded, in a multiple-service distributed architecture.

The present coherent optics technology solutions may be of further particular utility when leveraged in the cable environment as a means of multi-link aggregation, and/or through direct edge-to-edge connectivity to a desired endpoint, including without limitation, high speed wavelength services, remote PHY, remote MAC-PHY, ex-hauls, backhauls, remote FTTP backhauls, 3GPP 4G/5G/5GNR/6G wireless connectivity services, and/or other rapidly growing commercial services in the cable industry. Such services typically demand very high bandwidths, robustness, and flexibility, to support a diversity of different service tiers or levels. The integrated intelligent solutions described herein are thus of further advantageous utility to the growing service requirements for such market segments.

Converged Data Transmission in Coherent Backhauling

The above systems and methods are described above, by way of example and not in a limiting sense, with respect to a CPON as the coherent optical network and an IM-DD PON as the non-coherent optical network. The person of ordinary skill in the art will understand that the principles described above are applicable to other types of optical networks, as well as to coherent backhauling solutions for other remote optical network architectures in communication with the coherent network or CPON. For ease of explanation, the following embodiments are described with respect to a CPON as the exemplary coherent network.

The CPON backhauling solutions described above thus provide innovative provisioning solutions for further deployment scenarios, including (i) a Distributed Access Architecture (DAA), and/or (ii) a Distributed Converged Cable Access Platform (CCAP) Architecture, or DCA. The present embodiments demonstrate an efficient use of the CPON ONU to aggregate multiple optical links from distributed child nodes, which may then transport the aggregated data stream therefrom to the CPON OLT residing at the hub or headend. As illustrated above, the present systems and methods enable re-configuration of each child node to support different service groups, including without limitation, coaxial cable access with RPD and/or RMD, FTTP/FTTH using GPON or EPON, mobile xHaul, and business/enterprise connectivity.

In an exemplary embodiment, a passive optical splitter is used at the aggregation node of the backhauling architecture, thereby eliminating a need for active devices or an electrical power supply at the node. According to this scenario, the cost and the complexity of the system may be reduced, while also improving the reliability thereof. In other embodiments, power splitters may also, or alternatively, be deployed according to design preferences.

It has been conventionally known to use fiber as a media to transport digital data between the CCAP core and RPD, as defined by the 10G Initiative DCA strategy, which further proposes how to separate PHY or MAC functions closer to home/residential end users in the cable industry. Recent progress in cooperative transport interface (CTI) by the O-RAN Alliance has provided a set of mobile xHaul-supporting protocols enabling open-distributed units (O-DUs) to communicate with open-remote units (O-RUs) through a variety of transport media based on DOCSIS, GPON, and EPON protocols. However, at present, no conventional proposals have addressed the challenge to provide CPON backhauling of remote FTTP/FTTH services over conventional GPON and EPON systems. The following embodiments solve this problem in the industry through implementation of an innovative data re-encapsulation approach.

Figure 9:
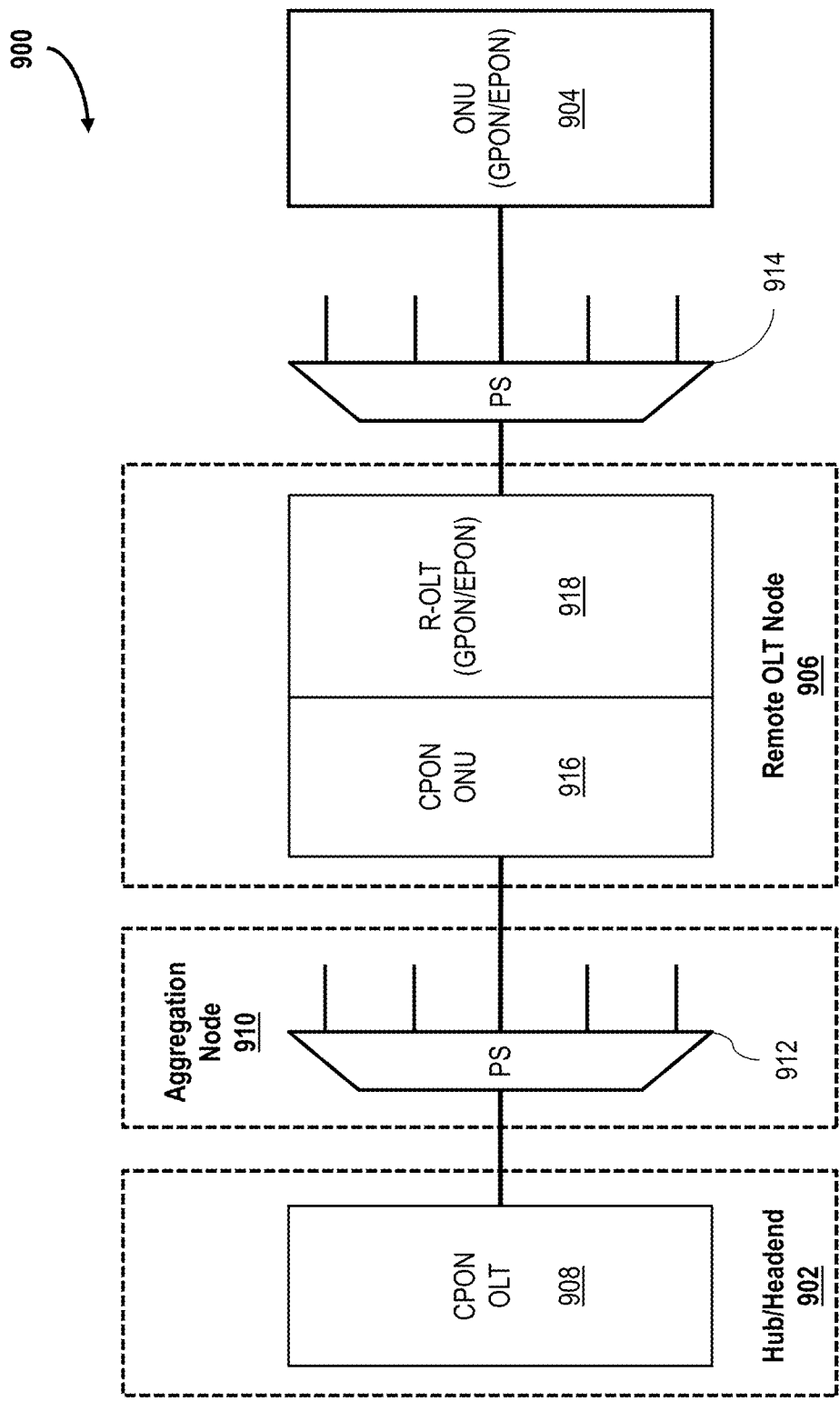
FIG. 9 is a schematic illustration of an exemplary optical network architecture implementing a backhauling service, in accordance with an embodiment.

FIG. 9 is a schematic illustration of an exemplary optical network architecture 900 implementing a backhauling service. Architecture 900 represents a simplified high-level diagram of a coherent backhauling implementation of FTTP/FTTH services for a hub/headend 902 to/from an end user ONU 904 through a remote OLT node 906. In the exemplary embodiment illustrated in FIG. 9, architecture 900 is depicted in a P2MP configuration, with hub/headend 902 including at least one CPON OLT 908 servicing remote OLT node 906 as one of a plurality of remote nodes (not separately shown) through an intervening aggregation node 910 configured with a first splitter 912. In a similar manner, remote OLT node is configured to service end user ONU 904 as one of a plurality of end user ONUs (also not separately shown) through an intervening second splitter 914. First and second splitters 912, 914 may, for example, be configured as power splitters or passive splitters.

In the exemplary embodiment, remote OLT (R-OLT) node 906 includes a remote CPON ONU 916 paired with an R-OLT 918. R-OLT 918 is illustrated in FIG. 9 to be configured as one of either a GPON or an EPON OLT corresponding to a similar configuration of end user ONU 904 as a GPON ONU or EPON ONU, respectively. Thus, a CPON backhauling network according to architecture 900 represents a cascaded network of two PONs, i.e., a CPON in a first stage transporting from CPON OLT 908 to R-OLT 918, and either a GPON or an EPON in the second stage transporting from R-OLT 918 to end user ONUs 904. In one exemplary scenario of a 100G coherent optical network, CPON OLT 908 may transport a 100G aggregated capacity in the first stage to R-OLT 918 (e.g., through aggregation node 910 and CPON ONU 916), and then R-OLT 918 may distribute 10G service to in the secondary stage to each respective end user ONU 904.

In an exemplary embodiment, architecture 900 may be advantageously configured with no active electrical or optical devices at aggregation node 910, thereby significantly simplifying the system design in comparison with architectures of conventional active optical networks (AONs), while also improving the reliability of the network. The CPON backhauling solution depicted in FIG. 9 provides still further advantages over conventional proposals, in that implementation of architecture 900 requires little to no physical alterations to existing PON systems, such as the CPONs and EPONs/GPONs linked through remote OLT node 906, nor to the new generations of direct detection 10G/25G PONs (e.g., the IM-DD PON described above with respect to FIGS. 5 and 6) planned to be deployed in the near future.

Systems and methods according to architecture 900 thus achieve a cost-effective transitionary solution to implement coherent optical networks/CPON immediately for GPON, EPON, and IM-DD PON ONUs until such legacy PONs fully transition over to all-coherent CPONs, at which time the CPON ONU will be able to penetrate deep into every home/end user and directly provide a 100G peak data rate for every end user subscriber, i.e., ten times the data rate realized by conventional non-coherent ONUs.

Nevertheless, coherent backhauling systems and methods according to architecture 900 still face the challenge, described above with respect to the CPON/IM-DD embodiments, of how to coordinate the two sets of dynamic bandwidth allocation (DBA) mechanisms or schedulers at R-OLT node 906 to achieve a smooth data transfer between the two different PON systems, while still realizing a reasonable low latency.

In a configuration using a conventional wavelength-division multiplexing (WDM) PON for backhauling, a typical implementation of two cascaded PONs in such a configuration would require, as described above with respect to FIG. 5, two series of buffers for the respective communication directions between the two different PONs, which in turn leads to buffer delays and longer in-queue waiting times for data packets to arrive. Without a proper control and management information exchange, the data transitioning between the two PONs can be quite slow especially when the network is in busy state. This type of configuration is described further below with respect to FIG. 10.

Figure 10:
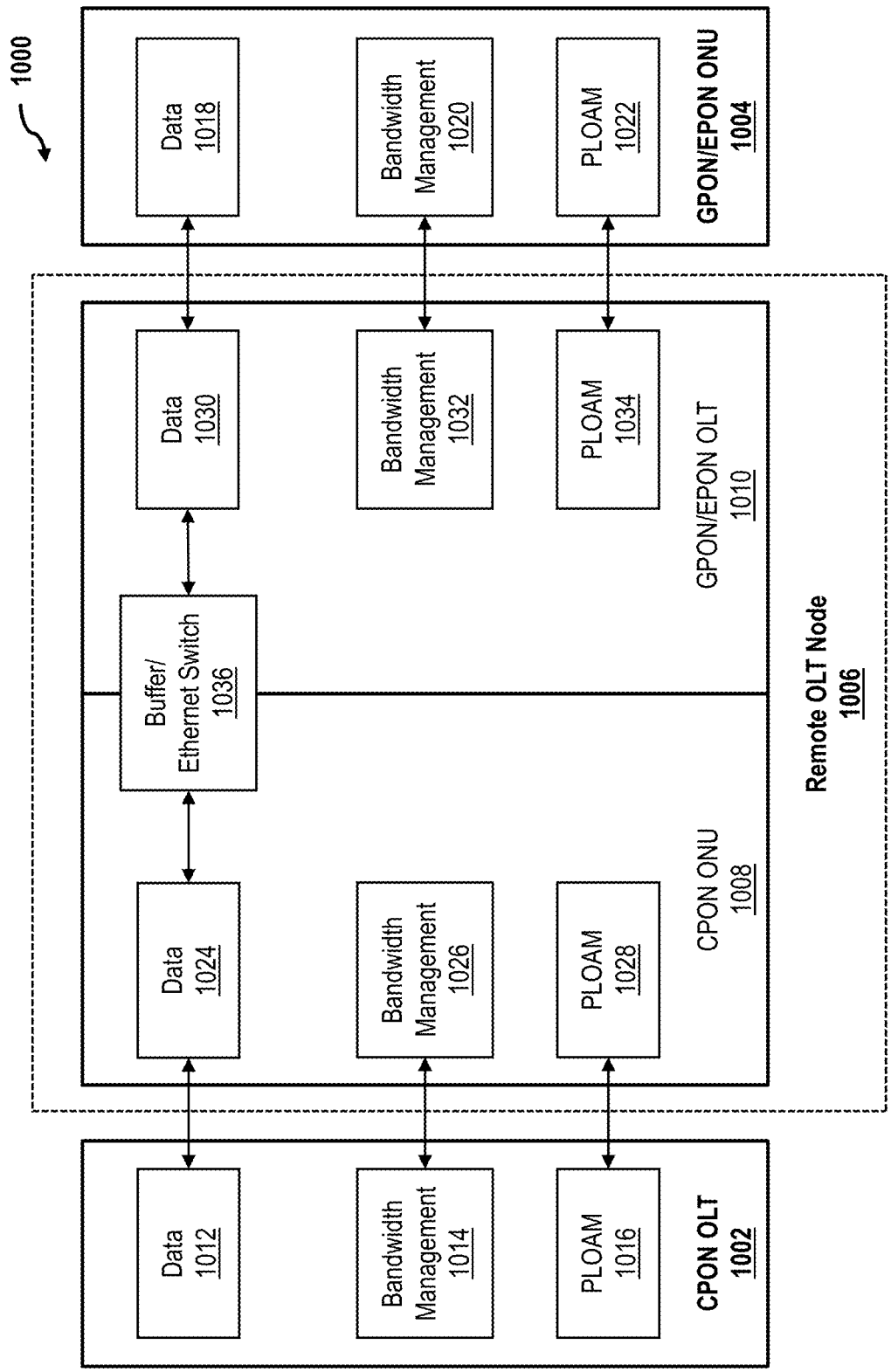
FIG. 10 is a schematic illustration of an exemplary remote coherent optical backhauling architecture, in accordance with an embodiment.

FIG. 10 is a schematic illustration of an exemplary remote coherent optical backhauling architecture 1000. In the exemplary embodiment depicted in FIG. 10, architecture resembles the conventional backhauling scheme using a WDM-PON, except that architecture 1000 includes a CPON OLT 1002 to enable coherent backhauling, which cannot be realized by a conventional WDM-PON architecture, as described above.

In an exemplary embodiment, architecture 1000 is similar in general structure and function to architecture 900, FIG. 9, and likewise represents a coherent backhauling solution (e.g., FTTP/FTTH services) using CPON OLT 1002 servicing a GPON/EPON ONU 1004 through an R-OLT node 1006. In this example, R-OLT node 1006 similarly includes a CPON ONU 1008 paired with a GPON/EPON OLT 1010, but various aggregation nodes and/or splitters are not shown for ease of further explanation. Architecture 1000 thus illustrates an exemplary MAC design scheme for coherent backhauling without implementing the innovative integrated MAC embodiments described above with respect to FIGS. 4-6.

In the embodiment depicted in FIG. 10, the two separate PON systems (i.e., CPON and GPON/EPON) represent independently-operated PONs, with CPON OLT 1002 including at least a C-OLT data transmission link controller 1012, a C-OLT bandwidth management module 1014, and a C-OLT physical layer operation, administration, and management (PLOAM) unit 1016. GPON/EPON ONU 1004 similarly includes its own G/E-ONU data transmission link controller 1018, a G/E-ONU bandwidth management module 1020, and a G/E-ONU PLOAM unit 1022.

In the exemplary embodiment, CPON ONU 1008, within R-OLT node 1006, similarly contains a counterpart set of a C-ONU data transmission link controller 1024, a C-ONU bandwidth management module 1026, and a C-ONU PLOAM unit 1028 in individual communication with C-OLT data transmission link controller 1012, C-OLT bandwidth management module 1014, and C-OLT PLOAM unit 1016, respectively. In a like manner, GPON/EPON OLT 1010 contains a separate counterpart set of a G/E-OLT data transmission link controller 1030, a G/E-OLT bandwidth management module 1032, and a G/E-OLT PLOAM unit 1034, in individual communication with G/E-ONU data transmission link controller 1018, G/E-ONU bandwidth management module 1020, and G/E-ONU PLOAM unit 1022, respectively.

According to this more typical configuration for architecture 900, even with the novel substitution of CPON OLT 1002, without an integrated MAC processor, as described above, there is almost no coordination between the respective PON systems. Instead, DBA between the two PONs is accomplished through implementation of an buffer or Ethernet switch 1036 disposed between, and connecting to, the two R-OLT data transmission channels 1024, 1030. The benefit of this optional design scheme is that it represents a simplest technique for connecting the data exchange between the two PON systems. This technique, however, may result in a tradeoff to higher latency due to multiple layers of buffering, queuing, and processing through buffer/Ethernet switch 1036.

The following embodiments, described further below with respect to FIGS. 11-12, demonstrate comparative improvements over architecture 1000, through the implementation of an integrated MAC scheme, similar to the embodiments above, at the respective R-OLT node in a cascaded PON architecture. For ease of comparison, the three separate DBA algorithmic management schemes, respectively illustrated in FIGS. 10-12, are depicted as having a substantially similar topological architecture with one another, with some structural differences to illustrate the advantages of the particular DBA scheme being implemented.

Figure 11:
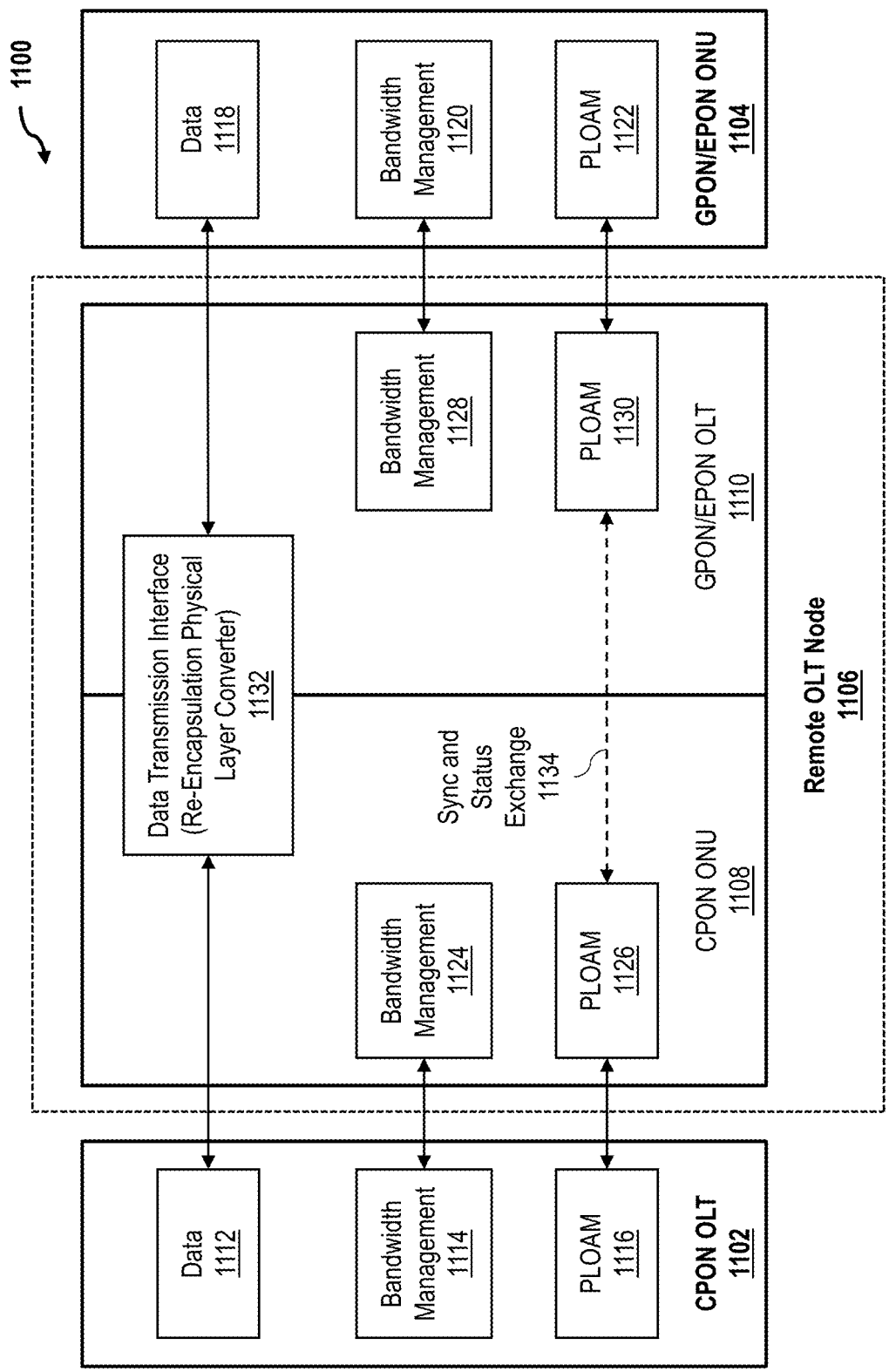
FIG. 11 is a schematic illustration of an alternative remote coherent optical backhauling architecture, in accordance with an embodiment.
Figure 12:
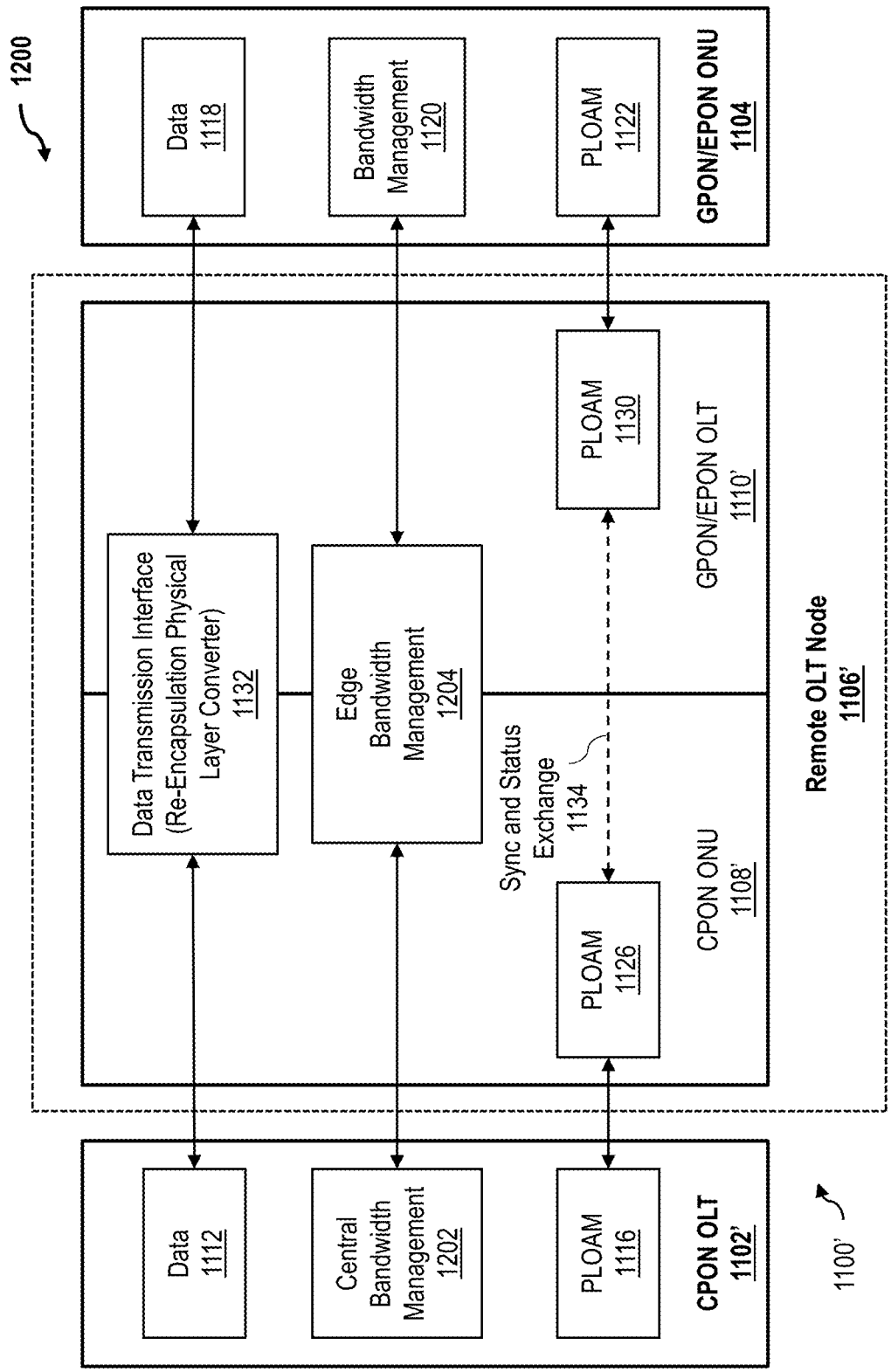
FIG. 12 is a schematic illustration of a converged bandwidth management solution for the remote coherent optical backhauling architecture depicted in FIG. 11.

In the exemplary embodiments depicted in FIGS. 11-12, data re-encapsulation is performed utilizing one or more of the integrated MAC design approaches, described above, at the respective R-OLT. According to this innovative approach, data re-encapsulation may be advantageously executed for conventional PON architectures at the R-OLT, thereby supporting efficient data conversion from an existing CPON system to traditional GPON and/or EPON systems at the network edge(s).

FIG. 11 is a schematic illustration of an alternative remote coherent optical backhauling architecture 1100. Architecture 1100 is illustrated as having a topology substantially consistent with architecture 1000, FIG. 10, and similarly includes a CPON OLT 1102 servicing a GPON/EPON ONU 1104 through an R-OLT node 1106 having a CPON ONU 1108 paired with a GPON/EPON OLT 1110. Also similar to architecture 1000, CPON OLT 1102 includes a C-OLT data transmission link controller 1112, a C-OLT bandwidth management module 1114, and a C-OLT PLOAM unit 1116, and GPON/EPON ONU 1104 includes its own G/E-ONU data transmission link controller 1118, a G/E-ONU bandwidth management module 1120, and a G/E-ONU PLOAM unit 1122. In the exemplary embodiment, CPON ONU 1108 includes a counterpart set of a C-ONU bandwidth management module 1124 and a C-ONU PLOAM unit 1126, and GPON/EPON OLT 1110 contains a separate counterpart set of a G/E-OLT bandwidth management module 1128 and a G/E-OLT PLOAM unit 1130, similar to elements of architecture 1000 having the same labels.

Architecture 1100 differs though, from architecture 1000, in that R-OLT 1106 implements an integrated MAC configuration according to one or more of the embodiments described above, to support data re-encapsulation in R-OLT 1106. That is, unlike R-OLT 1006, FIG. 10, the integrated MAC design of R-OLT 1106 renders individual data transmission link controllers, and thus also a buffer or switch therebetween, unnecessary for CPON ONU 1108 and G/EPON 1110. Instead, the integrated MAC configuration of R-OLT 1106 includes a single data transmission interface 1132, shared between CPON ONU 1108 and G/EPON 1110, and in direct communication (e.g., including over aggregation nodes, splitters, etc. (not separately shown)) with each of data transmission link controllers 1112, 1118.

In an exemplary embodiment, the integrated MAC configuration of R-OLT 1106 further enables a direct synchronization and status exchange link 1134 between C-ONU PLOAM 1126 and G/EPON OLT PLOAM 1130. According to this advantageous configuration, a timing synchronization mechanism may be introduced to match the timing clock (described above with respect to FIGS. 4-5) and further guarantee that the different PLOAM functions in CPON and G/EPON are maintained at the same pace.

Moreover, the incorporation of a single data transmission interface 1132 at R-OLT node 1106 enables the introduction of data re-encapsulation within data transmission interface 1132 itself, thereby allowing R-OLT node 1106 to avoid the delays resulting from use of a buffer/switch, and instead directly extract, encapsulate, and frame the data from one PON to the other. In the exemplary embodiment depicted in FIG. 11, such data re-encapsulation involves repacketizing the data from each PON such the data is converted according to the specific formats and timing grids across the two networks (described further below with respect to FIGS. 14-19B). In this example, the respective bandwidth allocation schemes of the two different networks are not directly coordinated at R-OLT 1106, and thus some delay during data transfer might still be introduced. A further solution to mitigate such data transfer delays, while also optimizing bandwidth efficiency, is described further below with respect to FIG. 12.

FIG. 12 is a schematic illustration of a converged bandwidth management solution 1200 for remote coherent optical backhauling architecture 1100, FIG. 11. That is, in the exemplary embodiment depicted in FIG. 12, solution 1200 substantially retains the topology of architecture 1100 (i.e., as architecture 1100'), except that, within CPON OLT 1102', C-OLT bandwidth management module 1114 is replaced by a converged centralized bandwidth management layer 1202, and within R-OLT node 1106', the separate C-ONU bandwidth management module 1124 and G/E-OLT bandwidth management module 1128 are replaced by a single edge bandwidth management module 1204 configured for substantially direct communication with both of converged centralized bandwidth management layer 1202 and G/E-ONU bandwidth management module 1120.

According to solution 1200, R-OLT node 1106' thus incorporates a supporting integrated MAC configuration that provides both (i) the data re-encapsulation elements of architecture 1100, and (ii) additional converged bandwidth management capability to further mitigate delays in data transport. In the exemplary embodiment depicted in FIG. 12, solution 1200 advantageously implements a two-layer bandwidth management approach.

The first layer is introduced at CPON OLT 1102', where converged centralized bandwidth management layer 1202 is configured with a highest scope of authority, which thus enables CPON OLT 1102' to both adjust the bandwidth for the G/EPON, and also to coordinate the bandwidth resource allocation of both the CPON and the G/EPON. The second layer is introduced at R-OLT node 1106', where edge bandwidth management module 1204 is configured to perform bandwidth allocation for G/EPON ONU(s) 1104. According to solution 1200, systems and methods are advantageously provided to accomplish both joint scheduling and proactive control, thereby effectively integrating the coherent and non-coherent systems to smoothly operate as a single system, thus enabling simplified and cost-effective latency optimization and bandwidth efficiency throughout the entire integrated coherent/non-coherent network system.

Exemplary data re-encapsulation techniques (e.g., through operation of data transmission interface 1132, FIGS. 11-12), are described further below with respect to FIGS. 14-19B.

Data Re-Encapsulation in an Integrated MAC

The integrated MAC solutions described above provide a unique and versatile design approach that enables cost-effective implementation of the data re-encapsulation techniques herein, and particularly for coherent backhauling services for a variety of non-coherent networks or systems. For ease of explanation, the following embodiments are provided by way of example, and not in a limiting sense, to demonstrate different coherent backhauling approaches utilizing data re-encapsulation for a GPON comparison with data re-encapsulation for an EPON. That is, the versatility of the integrated MAC solutions described herein may be advantageously applicable to coherent backhauling for a variety of different non-coherent systems, which employ different respective PON standards. An illustrative comparison of GPON and EPON standards is described further below with respect to FIGS. 13A-B.

FIGS. 13A-B are comparative graphical illustrations depicting conventional uplink data link processes 1300, 1302, respectively. More specifically, process 1300 depicts how an uplink (UL) transmission is established for a GPON (e.g., GPON ONU 1104 and/or GPON OLT 1110, FIG. 11), and process 1302 depicts a similar UL transmission establishment, but for an EPON (e.g., GPON ONU 1104 and/or GPON OLT 1110, FIG. 11). As may be seen from a comparison of processes 1300, 1302, whereas the EPON UL transmission (e.g., process 1302) utilizes a random contention window, the GPON UL transmission (e.g., process 1300) utilizes a GPON framework having a well-defined timing grid and slot duration, with all GPON PHY functions strictly following a unified 125 microsecond (µs) frame duration.

Accordingly, the CPON embodiments described herein may adopt a PHY and MAC framework design to integrate with either type of non-coherent network, namely an ITU-T series for the GPON, or an IEEE series for the EPON. However, for convenience of explanation, the following embodiments assume that the CPON implements a timing scheme similar to the GPON (e.g., process 1300). That is, in an exemplary embodiment, the CPON utilize a well-defined timing grid and slot duration to provide greater capability for orderly clock synchronization and efficient coordination of all system-wide operations of the various different access technologies. This exemplary CPON MAC/PHY framework though, is provided by way of illustration, and not in a limiting sense.

According to this exemplary timing scheme for the CPON, the following embodiments provide comparative examples for integrating different MAC layers of the CPON for a GPON, as opposed to an EPON. More particularly, exemplary embodiments for CPON backhauling of GPON services is described further below with respect to FIGS. 14-16, and exemplary embodiments for CPON backhauling of EPON services is described further below with respect to FIGS. 17-19B.

FIG. 14 illustrates an exemplary timing flow diagram 1400 for bi-directional data transmission in a GPON. In the exemplary embodiment depicted in FIG. 14, diagram 1400 is illustrated with respect to GPON OLT 1110, FIGS. 11-12, and a pair of separate GPON ONUs 1104 (e.g., GPON ONUs 1104(1), 1104(2)) in communication with GPON OLT 1110 in the GPON. As described above with respect to process 1300, FIG. 13A, the PHY frame duration for GPON OLT 1110 and GPON ONUs 1104 is 125 µs for both of the upstream PHY frame grid and the downstream PHY frame grid.

In an exemplary embodiment, the 125 µs timing grids for the respective DL and UL do not overlap. That is, data transmission actions commence and complete within the 125 µs grid at the respective transmitter and receiver sides of the data transmission. To achieve this well-ordered timing, GPON specifications define a set of strict protocols to synchronize the clock at the OLT and the ONUs (e.g, GPON OLT 1110 and GPON ONUs 1104).

A most recent GPON specification allows fragmentation of the transmitted data. In other words, one GPON service data unit may be split into two portions, and these two fragmented data unit portions may then be separately transmitted in different timing frames. Nevertheless, this more recent fragmentation capability in the GPON is still based on the same 125 µs grid, and closely adheres to all of the established GPON strict timing rules.

Accordingly, in the exemplary embodiment, the GPON framing design may be readily adapted to the remote OLT of the present systems and methods (e.g., R-OLT node 1106, FIG. 11) with only relatively modest modifications to the system, such as some additional overhead, as well as some procedures for synchronization and calibration, as described above with respect to FIGS. 11-12. Thus, a framing scheme for the integrated MAC that is similar to the GPON framing grid provides an optimal solution for achieving data backhauling between the CPON and the GPON. In one exemplary implementation scenario, assuming use of a Reed-Solomon (248, 216) forward error correction (FEC) coding in the GPON, the total DL data rate will be 9.951744 Gb/s.

Thus, the transmission timing scheme of diagram 1400 is substantially similar to the conventional GPON timing scheme (i.e., a more detailed illustration of process 1300, FIG. 13A). When implemented with a GPON OLT (e.g., GPON OLT 1110, FIGS. 11-12) according to the present embodiments though, re-encapsulation of the GPON OLT data for coherent backhauling may be substantially realized, and efficiency of the overall integrated network may be greatly improved, as described further below with respect to FIGS. 15-16.

FIG. 15 illustrates an exemplary coherent backhauling data re-encapsulation scheme 1500 for the GPON DL of diagram 1400, FIG. 14. In the exemplary embodiment depicted in FIG. 15, scheme 1500 is illustrated with respect to CPON ONU 1108, GPON OLT 1110, and data transmission interface 1132, FIG. 11, and represents a simplified GPON fixed data rate case scenario, such as that utilized to easily separate, for example, individual 10G transport signals from a 100G aggregated signal.

In an exemplary embodiment of scheme 1500, a CPON DL timing grid 1502 of the downstream signal from CPON ONU 1108 is configured to substantially coordinate with a GPON DL timing grid 1504 of GPON OLT 1110. That is, all DL timing grids 1502, 1504 represent a 125 µs timing slot (e.g., analogous to coherent timing slots k of CPON OLT 606, FIG. 8). Each CPON DL timing grid 1502 may then be structured to have a GPON partition portion 1506 and CPON DL frame portion 1508.

In exemplary operation of scheme 1500, for every downstream frame of the 125 µs CPON DL grid 1502, a fixed part of the CPON payload, namely, GPON partition portion 1506, is loaded with a GPON DL payload 1506' for data rate conversion and retiming according to the data re-encapsulation processing by data transmission interface 1132. GPON DL payload 1506' may, for example, be or include an XG-PON transmission convergence (XGTC) payload. Typically, the size of an XGTC payload is fixed, thus giving an XGTC frame size (135432 bytes in ITU-T G987.3) deducted by XGTC frame header.

At GPON OLT 1110, dynamic bandwidth allocation and other PHY-layer control processing may be independently performed. For example, at GPON OLT 1110, the data of GPON DL payload 1506" may be retimed, e.g., by mapping the data from a CPON buffer address into a GPON buffer address, and then a header portion 1510 (e.g., an XGTC frame header) may be added before the corresponding GPON DL payload 1506", and with bandwidth map (e.g., from GPON bandwidth management module 1128, FIG. 11, edge bandwidth module 1204, FIG. 12) and PLOAM messages (e.g., from GPON PLOAM unit 1130) included with header portion 1510.

In some embodiments, GPON OLT 1110 may be further configured to perform FEC encoding, and also to pad, at the beginning of each downstream PHY frame in GPON DL grid 1504, a downstream physical synchronization block (PSBd). According to the innovative integrated techniques of scheme 1500, downstream CPON backhauling data re-encapsulation for a GPON may be efficiently realized for each of the embodiments described above. Furthermore, because GPON OLT 1110 is expected to periodically receive upstream bursts from GPON ONUs 1104, data re-encapsulation for the upstream is described further below with respect to FIG. 16.

FIG. 16 illustrates an exemplary coherent backhauling data re-encapsulation scheme 1600 for the GPON UL of diagram 1400, FIG. 14. In the exemplary embodiment depicted in FIG. 16, scheme 1600 is also illustrated with respect to CPON ONU 1108, GPON OLT 1110, and data transmission interface 1132, FIG. 11, and also follows the same 125 µs timing frame configuration as the DL case scenario described above with respect to scheme 1500, FIG. 15. That is, according to scheme 1600 upstream bursts received at GPON OLT 1110 (e.g., from GPON ONU(s) 1104 rented the relevant time slots) within a particular 125 µs window of an upstream PHY frame grid 1602 will be completed within a same 125 µs window of a corresponding CPON UL grid 1604.

In exemplary operation of scheme 1600, GPON OLT 1110 receives one or more UL burst frames 1606. In an exemplary embodiment, each UL burst frame 1606 may include a UL header portion 1608 (e.g., an XGTC header) and a UL payload portion 1610. At the PHY of GPON OLT 1110, the respective burst frames 1606 may then be decoded and the PSBd thereof, where applicable, removed. After decoding/PSBd removal, the integrated MAC shared between GPON OLT 1110 and CPON ONU 1108 may be configured to collect data from UL burst frames 1606 falling the same window of a grid 1602, 1604, and then remove the respective UL header/XGTC header portions 1608 after the collected data is retimed (e.g., utilizing data transmission interface 1132) into repacked upstream data units 1612 provided to CPON ONU 1108 as an aggregated payload.

At CPON ONU 1108, repacked upstream data units 1612' thus become portions of the subsequent CPON upstream burst transmission that is under the control and management of the CPON transmission convergence protocol. In an exemplary embodiment, control and management information for the CPON transmission convergence protocol may be advantageously added as part of a Layer 2 (L2) header for the CPON. In some embodiments, UL payload portion 1610' may include multiple aggregated payloads for a single XGTC header portion 1608, thereby enabling significantly improved transmission efficiency for multiple GPON ONUs 1104 and a P2MP configuration.

In some embodiments, where it may be desirable to further reduce timing complexity and more efficiently utilize bandwidth, a guard time (not shown in FIG. 16) between GPON upstream bursts 1606 may be eliminated, and those bursts 1606 may then be more densely aggregated at CPON ONU 1108 according to scheme 1600. In this scenario, it may be further desirable to maintain the header according to the XG-PON encapsulation method (XGEM) inside the GPON payloads such that the elimination of the guard time does not affect data-unit source and destination recognition.

In some embodiments according to scheme 1600, it may also be desirable to retain the respective dynamic bandwidth report unit (DBRu), such that CPON OLT 1102, FIG. 11, may better estimate the traffic status and accordingly adjust the bandwidth allocated for the PON. Through implementation of the data re-encapsulation techniques illustrated with respect to scheme 1600, the bandwidth allocation between CPON and GPON advantageously become "quasi-fixed." Nevertheless, the versatility of systems and methods according to scheme 1600, as well as the additional embodiments described above, further enable the bandwidth allocation for the PON to be extendible, such that an adaptive GPON partition size with statistical multiplexing may be introduced in the CPON to support multiple GPONs, thereby providing higher bandwidth efficiency across the entire integrated multiple-PON system.

These mechanisms for accomplishing CPON backhauling of GPON though, appear relatively less complex in comparison with the mechanisms for accomplishing CPON backhauling of EPON. That is, because the EPON generally follows the Ethernet P2MP link defined in the IEEE 802.3 specifications, the EPON does include a well-defined time grid like the 125 μs frame cycle in the GPON. Many EPON data transmission schemes, for example, are built upon interleaved polling with adaptive cycle time (IPACT) techniques. An exemplary IPACT operation is described further below with respect to FIG. 17.

FIG. 17 illustrates an exemplary timing flow diagram 1700 for bi-directional data transmission in an EPON 1702. In the exemplary embodiment depicted in FIG. 17, diagram 1700 is illustrated with respect to EPON OLT 1110, FIGS. 11-12, and a pair of separate EPON ONUs 1104 (e.g., EPON ONUs 1104(1), 1104(2)) in communication with EPON OLT 1110 in the EPON. As depicted in FIG. 17, diagram 1700 represents a case scenario where two different EPON ONUs 1104(1), 1104(2) are interleaved in time to communicate with EPON OLT 1110 through report frames configured to report their respective queue status to EPON OLT 1110 for bi-directional data transmission in the EPON based on IPACT.

In the embodiment depicted in FIG. 17, only two EPON ONUs 1104 are illustrated for ease of explanation. The person of ordinary skill the art will understand that the principles described with respect to the present embodiments are applicable to a significantly larger plurality of EPON ONUs 1104 for an individual EPON OLT 1110 without departing from the scope herein.

According to diagram 1700, after receiving different report frames from EPON ONUs 1104(1), 1104(2), EPON OLT 1110 calculates and distributes granted time slots, each with set start and end times, for both EPON ONUs 1104(1), 1104(2). This time slot information may, for example, be carried by gate frames and the inserted into gaps between individual DL data frames of EPON OLT 1110 for broadcast to all EPON ONUs 1104 in the network. In an EPON though, it is notable that there is no strict coordination for this request-and-grant. Whereas EPON OLT 1110 may be configured to only take actions within specific timing windows of the respective DL frames, each EPON ONU 1104. On the other hand, may send report frames at any time when that report does not conflict with a report from another EPON ONU 1104.

Accordingly, during a typical conventional EPON transmission process (e.g., process 1302, FIG. 13B), to simplify coordination and avoid collisions, the report frame from a particular EPON ONU is expected to follow the data frame from that same EPON ONU, for subsequent delivery to the EPON OLT. However, this conventional EPON transmission process results in data frames being more randomly distributed in time, which is conventionally present significant challenges to providing a backhaul network supporting EPON FTTH services. Nevertheless, as described further below with respect to FIGS. 18-19B, these challenges are substantially overcome by integrating the EPON (e.g., EPON OLT 1110 and EPON ONU 1104, FIGS. 11-12) according to the integrated MAC and data re-encapsulation embodiments described above.

FIG. 18 illustrates an exemplary coherent backhauling data re-encapsulation scheme 1800 for the EPON DL of diagram 1700, FIG. 17. In the exemplary embodiment depicted in FIG. 18, for ease of comparison, scheme 1800 is similar to scheme 1500 in many aspects, and is illustrated with respect to EPON ONU 1108, EPON OLT 1110, and data transmission interface 1132, FIG. 11. In an exemplary embodiment of scheme 1800, for ease of comparison, the DL data re-encapsulation processing for the cascaded CPON and EPON, CPON ONU 1108 implements a fixed frame cycle duration for a CPON DL grid 1802, similar to that described above with respect to the cascaded CPON and GPON described above with respect to scheme 1500. Implementation of a fixed frame cycle duration in the CPON further serves to significantly simplify the scheduling complexity, even when cascaded with the non-fixed, random frame configuration of the EPON.

Also similar to scheme 1500, FIG. 15, in scheme 1800, each CPON DL grid 1802 may be structured to have an EPON partition portion 1804 and CPON DL frame portion 1806. In exemplary operation of scheme 1800, for every downstream frame of CPON DL grid 1802, a fixed part of the CPON payload, namely, EPON partition portion 1804, is reserved for Ethernet packets 1808 of the EPON for delivery to EPON OLT 1110. In an exemplary embodiment, data transmission interface 1132 configured to extract, re-time, and send Ethernet packets 1808 to a queue of EPON OLT 1110 ready for downstream broadcast.

In the exemplary embodiment depicted in FIG. 18, EPON OLT 1110 is further illustrated as being configured to interpolate gate packets 1810 in between Ethernet data packets 1808' to enable grants of UL bandwidth resources to EPON ONUs 1104. In an exemplary embodiment, EPON OLT 1110 is still further configured to report its scheduled gate packets 1810 to CPON ONU 1108 for a specific future timing period, thereby enabling the CPON to advantageously adjust the reserved size of the CPON for loading the relevant Ethernet packets 1808' for the EPON. According to this exemplary scenario, the integrated MAC configuration of the cascaded CPON and EPON is enabled to further improve the bandwidth efficiency of the overall system, while also significantly reducing buffering time.

FIGS. 19A-B illustrate exemplary coherent backhauling data re-encapsulation schemes 1900, 1902, respectively, for the EPON UL of diagram 1700, FIG. 17. More specifically, scheme 1900, FIG. 19A, represents an exemplary scenario of UL data re-encapsulation for CPON backhauling EPON without data fragmentation, whereas scheme 1902, FIG. 19B, represents an exemplary scenario of UL data re-encapsulation for CPON backhauling EPON utilizing cross-frame data fragmentation. In other words, schemes 1900, 1902 depict two different upstream burst operational modes for coherent backhauling of an EPON, namely, (i) an inactivated Ethernet fragmentation mode (i.e., FIG. 19A), and (ii) an enabled Ethernet fragmentation mode (i.e., FIG. 19B).

In an exemplary embodiment, both of schemes 1900, 1902, and thus both operational modes as well, are depicted with respect to implementation with CPON ONU 1108, data transmission interface 1132, and EPON OLT 1110, FIGS. 11-12. Similar to the EPON DL scenario described above with respect to scheme 1800, FIG. 18, for ease of comparison an explanation, CPON ONU 1108 is again depicted as implementing a fixed frame cycle duration for CPON DL grids 1902.

In exemplary operation, for both operational modes, EPON OLT 1110 is configured to continuously receive a series of upstream bursts 1904 from respective EPON ONUs (e.g., EPON ONUs 1104) containing individual UL packet portions 1906 interspersed with individual UL reports 1908. In cooperation with data transmission interface 1132, both of schemes 1900, 1902 operate to discard UL reports 1908, as well as other non-packet functional frames that may be included in the series of upstream bursts 1904, and then aggregate and re-time the remaining UL data packets 1910 into a buffer for fitting into respective CPON UL grid frames 1902 as repackaged UL packets 1912 at CPON ONU 1108.

In the first operational mode depicted in FIG. 19A, in the case where Ethernet fragmentation is inactivated, when the end time of a particular Ethernet packet frame (UL packet portion 1906(3), in this example) exceeds the end time of a previous CPON framing window (CPON UL grid 1902(2), in this example), that particular ethernet packet frame will wait inside the buffer until being loaded to the next framing window (e.g., CPON UL grid 1902(3)).

In contrast, as illustrated in the second operational mode depicted in FIG. 19B, in the case where Ethernet packet fragmentation is enabled, when the duration of the same UL EPON Ethernet packet (i.e., UL packet portion 1906(3)) falls between two CPON framing windows (i.e., CPON UL grids 1902(2), 1902(3)), that particular UL packet may alternatively be split into two separate sub-packets 1914(1), 1914(2), and first sub-packet 1914(1) may then be loaded onto the current CPON frame (i.e., CPON UL grid 1902(2)) and second sub-packet 1914(2) may then be loaded onto the next CPON frame (i.e., CPON UL grid 1902(3)). In an exemplary embodiment, markers may be added to sub-packets 1914(1), 1914(2) to denote origination from a single original UL packet (i.e., UL packet portion 1906(3)) such that the two sub-packets may be merged after completing transmission in the data link layer. A benefit realized from enabling Ethernet packet fragmentation is that higher bandwidth efficiency may be achieved, while also reducing the latency to transmit Ethernet packets of larger size, which can often arise from the random sizes of UL packets 1906.

After reframing of EPON Ethernet packet inside CPON ONU 1108, repackaged packets 1912 may then be sent out through CPON upstream bursts. Overall, the retiming process for CPON backhauling EPON-based FTTH services may be more complex, yet still may be advantageously realized according to the innovative designs of the present data retiming mechanisms. The present systems and methods therefore advantageously achieve innovative and useful data retiming and re-encapsulation methods for integrated MAC configurations for CPON backhauling FTTH services. The present integrated MAC embodiments therefore further support remote OLT implementation for future converged networks based on DCA, thereby providing a unique solution that leverages the high backhauling capacity of the CPON in a cost-efficient manner.

Exemplary embodiments of systems and methods for integrated ONUs and coherent backhauling in optical communication networks are described above in detail. The systems and methods of this disclosure though, are not limited to only the specific embodiments described herein, but rather, the components and/or steps of their implementation may be utilized independently and separately from other components and/or steps described herein.

Although specific features of various embodiments of the disclosure may be shown in some drawings and not in others, this convention is for convenience purposes and ease of description only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. An integrated transceiver for a coherent optical communication network, comprising:
   a first optical transceiver portion configured to receive and transmit coherent optical signals from and to the coherent optical communication network, respectively;
   a second optical transceiver portion configured to receive and transmit non-coherent optical signals respectively from and to a non-coherent optical communication network;
   an integrated media access control (MAC) processor disposed between the first and second optical transceiver portions, the integrated MAC processor configured to (i) exchange cooperative scheduling information from the first optical transceiver portion to the second optical transceiver portion, and (ii) enable the first optical transceiver portion to schedule data traffic between the coherent and non-coherent optical communication networks using scheduling information obtained from a control plane of the second optical transceiver portion.

2. The integrated transceiver of claim 1, further comprising a local memory in operable communication with the integrated MAC processor and each of the first and second optical transceiver portions.

3. The integrated transceiver of claim 2, wherein the coherent optical signals include at least one downlink (DL) coherent signal from the coherent optical communication network and at least one uplink (UL) coherent signal to the coherent optical communication network.

4. The integrated transceiver of claim 3, wherein the non-coherent optical signals include at least one DL intensity modulation/direct detection (IM-DD) signal to the non-coherent optical communication network and at least one UL IM-DD signal from the non-coherent optical communication network.

5. The integrated transceiver of claim 4, wherein the local memory is configured to buffer the at least one UL IM-DD signal.

6. The integrated transceiver of claim 4, further comprising a local clock unit in operable communication with the integrated MAC processor, the local memory, and each of the first and second optical transceiver portions.

7. The integrated transceiver of claim 6, wherein the scheduling information includes scheduling requirements for at least two different transceivers of the non-coherent optical communication network.

8. The integrated transceiver of claim 6, wherein the integrated MAC processor is further configured to centrally schedule traffic between the coherent optical communication network and the non-coherent optical communication network.

9. The integrated transceiver of claim 8, wherein the integrated MAC processor is further configured to enable traffic from the non-coherent optical communication network to be scheduled from the coherent optical communication network.

10. The integrated transceiver of claim 8, wherein the integrated MAC processor is further configured to implement a pre-determined bandwidth allocation scheme for the coherent optical communication network, and a dynamic bandwidth allocation scheme for the non-coherent optical communication network.

11. The integrated transceiver of claim 10, wherein the integrated MAC processor is further configured to assign a higher priority to bandwidth that is not shared between the coherent optical communication network and the non-coherent optical communication network.

12. The integrated transceiver of claim 1, wherein the first optical transceiver portion comprises a coherent optical network unit (ONU).

13. The integrated transceiver of claim 12, wherein the second optical transceiver portion comprises an intensity modulation/direct detection (IM-DD) optical line terminal (OLT).

14. The integrated transceiver of claim 12, wherein the second optical transceiver portion comprises a downstream external physical layer (PHY) interface (DEPI) modulator and an upstream external PHY interface (UEPI) demodulator.

15. The integrated transceiver of claim 14, wherein the second optical transceiver portion further comprises a digital-to-analog converter (DAC) and an analog-to-digital converter (ADC).

* * * * *